US008224560B2

(12) United States Patent
Motonaga et al.

(10) Patent No.: US 8,224,560 B2
(45) Date of Patent: Jul. 17, 2012

(54) ECO-DRIVE SUPPORT DEVICE AND METHOD

(75) Inventors: Yutaka Motonaga, Kobe (JP); Kan Saito, Okazaki (JP)

(73) Assignees: Fujitsu Ten Limited, Kobe-shi (JP); Toyota Jidosha Kabushiki Kaisha, Toyota (JP)

( * ) Notice: Subject to any disclaimer, the term of this patent is extended or adjusted under 35 U.S.C. 154(b) by 507 days.

(21) Appl. No.: 12/292,838

(22) Filed: Nov. 26, 2008

(65) Prior Publication Data

US 2009/0143934 A1    Jun. 4, 2009

(30) Foreign Application Priority Data

Nov. 30, 2007 (JP) ................................ 2007-310241

(51) Int. Cl.
*B60K 35/00* (2006.01)
(52) U.S. Cl. ............................ 701/123; 340/439; 434/66
(58) Field of Classification Search .................. 701/29, 701/123; 73/114.52, 114.53; 340/439
See application file for complete search history.

(56) References Cited

U.S. PATENT DOCUMENTS

| 4,398,174 | A | * | 8/1983 | Smith, Jr. ................... 340/450.2 |
| 4,542,460 | A | * | 9/1985 | Weber ............................... 701/1 |
| 4,570,226 | A | * | 2/1986 | Aussedat ....................... 701/123 |
| 4,675,654 | A | * | 6/1987 | Copeland ....................... 340/502 |
| 4,723,215 | A | * | 2/1988 | Hibino et al. ................. 701/123 |
| 5,473,938 | A | * | 12/1995 | Handfield et al. ............ 73/146.5 |
| 5,487,002 | A | * | 1/1996 | Diller et al. ..................... 701/1 |
| 5,648,755 | A | * | 7/1997 | Yagihashi ...................... 340/439 |
| 5,693,876 | A | * | 12/1997 | Ghitea et al. ................ 73/114.53 |
| 6,087,929 | A | * | 7/2000 | Charzinski et al. ............ 340/439 |
| 6,092,021 | A | * | 7/2000 | Ehlbeck et al. ................ 701/123 |
| 6,580,973 | B2 | * | 6/2003 | Leivian et al. ..................... 701/1 |
| 6,600,413 | B1 | * | 7/2003 | Lo ................................. 340/439 |
| 6,940,401 | B2 | * | 9/2005 | Taxon ........................ 340/450.2 |
| 7,024,306 | B2 | * | 4/2006 | Minami et al. ................ 701/123 |
| 7,130,766 | B2 | * | 10/2006 | Tanase .......................... 702/182 |

(Continued)

FOREIGN PATENT DOCUMENTS

JP    U-3-93729    9/1991

(Continued)

OTHER PUBLICATIONS van der Voort et al., Reducing Fuel Consumption by Using a New Fuel-Efficiency Support Tool, Sep.-Oct. 1999, 1999 IEEE AFRICON, vol. 1, pp. 27-32.*

(Continued)

*Primary Examiner* — Thomas G. Black
*Assistant Examiner* — Lindsay M Browder
(74) *Attorney, Agent, or Firm* — Oliff & Berridge, PLC

(57) ABSTRACT

An eco-drive support device that notifies a driver of the eco-friendliness of a vehicle driving operation being performed by the driver includes: an operating unit that calculates eco-drive support information that indicates the eco-friendliness of the vehicle driving operation being performed by the driver; and a notification control unit that controls a notifying unit to notify the driver of the eco-drive support information, if there is a request from an input unit for notification of the eco-drive support information. In this device, the notification control unit controls the notifying unit to notify the driver of the eco-drive support information though there is not a request from the input unit for notification of the eco-drive support information, if a predetermined condition for providing the eco-drive support information is satisfied.

17 Claims, 19 Drawing Sheets

U.S. PATENT DOCUMENTS

| | | | |
|---|---|---|---|
| 7,216,022 B2* | 5/2007 | Kynast et al. | 701/1 |
| 7,512,477 B2* | 3/2009 | Quigley et al. | 701/103 |
| 7,646,289 B2* | 1/2010 | Tamai et al. | 340/439 |
| 7,899,591 B2* | 3/2011 | Shah et al. | 701/30 |
| 2005/0234617 A1* | 10/2005 | Kynast et al. | 701/36 |
| 2006/0058955 A1* | 3/2006 | Mehren | 701/209 |
| 2008/0319602 A1* | 12/2008 | McClellan et al. | 701/33 |

FOREIGN PATENT DOCUMENTS

| | | |
|---|---|---|
| JP | A-2000-060193 | 2/2000 |
| JP | A-2002-114056 | 4/2002 |
| JP | A-2003-034205 | 2/2003 |
| JP | A-2003-220851 | 8/2003 |
| JP | A-2003-237510 | 8/2003 |
| JP | A-2003-254210 | 9/2003 |
| JP | A-2003-316864 | 11/2003 |
| JP | A-2004-45180 | 2/2004 |
| JP | A-2005-061287 | 3/2005 |
| JP | A-2005-127206 | 5/2005 |
| JP | A-2006-57484 | 3/2006 |
| JP | A-2006-090177 | 4/2006 |
| JP | A-2006-240368 | 9/2006 |
| JP | A-2007-032522 | 2/2007 |
| JP | A-2007-112257 | 5/2007 |
| JP | A-2007-195490 | 8/2007 |
| JP | A-2007-279886 | 10/2007 |

OTHER PUBLICATIONS van der Voort et al., A Prototype Fuel-Efficiency Support Tool, Aug. 2001, Transportation Research Part C: Emerging Technologies, vol. 9, Issue 4, pp. 279-296.* van der Voort, FEST—A New Driver Support Tool That Reduces Fuel Consumption and Emissions, Sep. 2001, International Conference on Advanced Driver Assistance Systems 2001 (ADAS '01), pp. 90-93.*

Toyota Motor Corporation, Toyota to Introduce Eco Drive Indicator—New Feature Aims to Encourage Environmentally Considerate Driving, Sep. 2006, Retrieved on May 4, 2011 from http://www.toyota.co.jp/en/news/06/0929.html.*

Notification of Reasons for Refusal dispatched on Dec. 1, 2009 in corresponding Japanese Patent Application No. 2007-310241.

Japanese Office Action issued in JP Application No. 2010-020621 dated Jun. 14, 2011 with English translation.

* cited by examiner

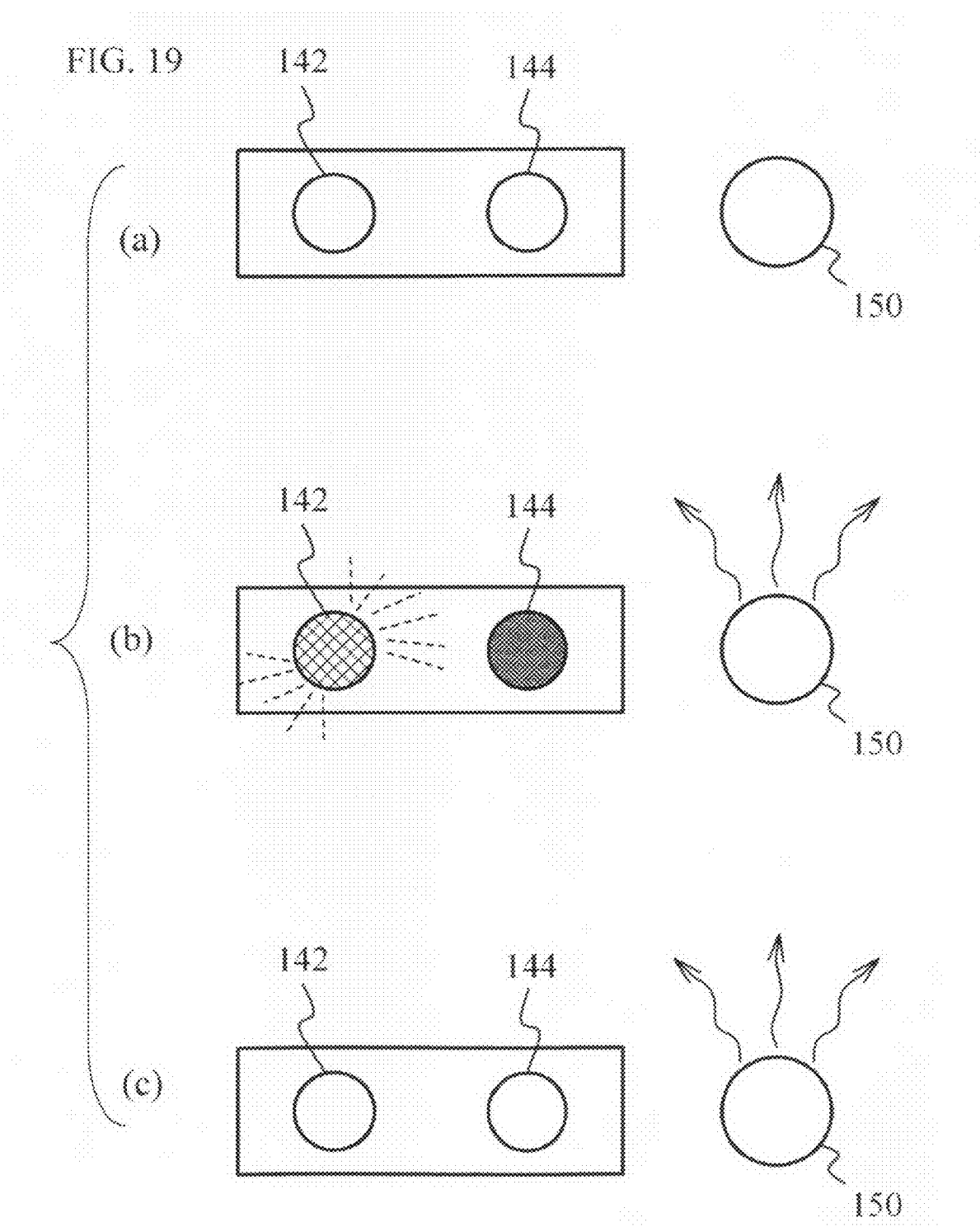

ECO-DRIVE SUPPORT DEVICE AND METHOD

FIELD

The present invention generally relates to an eco-drive support device and method.

BACKGROUND

There has been a technique related to an eco-drive support device that determines whether a vehicle driving operation being performed by a driver is a fuel-saving driving operation, and notifies the driver of the determination result, so as to improve the eco-consciousness in the driving operation by the driver.

For example, Japanese Unexamined Patent Publication No. 2003-220851 (hereinafter referred to as Reference 1) discloses a technique related to an eco-drive support device that notifies the driver of a result of a check made to determine whether the driving operation is a fuel-saving driving operation, if there is a request from the driver for notification of the determination result.

More specifically, the eco-drive support device disclosed in Reference 1 includes an eco-switch for switching the speed mode between a regular speed mode and an economy speed mode for reducing fuel consumptions. In a case where the driver selects the economy speed mode, the eco-drive support device determines whether the driving operation being performed by the driver is a fuel-saving driving operation. If the determination result indicates a fuel-saving driving operation, the eco-drive support device performs a control operation to switch on an eco-lamp that is provided on the panel meter in the driver's seat. Accordingly, the driver can be informed that the driving operation being performed by the driver is a fuel-saving driving operation.

There is an increasing demand for realization of an environment-friendly motorized society (hereinafter referred to as improvement of eco-consciousness in a motorized society). An eco-drive support device is regarded as beneficial in improving eco-consciousness in a motorized society. However, the eco-drive support device disclosed in Reference 1 does not control the eco-lamp to light up, if the driver does not select the economy speed mode.

For example, a driver who is not aware that an eco-drive support device is mounted on the vehicle might not select the economy speed mode. Also, a driver who is not interested in improving the eco-consciousness in the motorized society might not select the economy speed mode, even where a highly eco-conscious driving operation is possible. In cases of such drivers, the eco-drive support device disclosed in Reference 1 does not control the eco-lamp to light up. If the eco-lamp is not controlled to light up, it is difficult to cause such drivers to perform a highly eco-conscious driving operation. In that case, it is difficult to improve eco-consciousness in a motorized society.

SUMMARY

It is therefore an object of the present invention to provide an eco-drive support device and method in which the above disadvantages are eliminated.

A more specific object of the present invention is to provide an eco-drive support device and method that can improve eco-consciousness in a motorized society.

According to an aspect of the present invention, there is provided an eco-drive support device that notifies a driver of eco-friendliness of a vehicle driving operation being performed by the driver, the eco-drive support device including: an operating unit that calculates eco-drive support information that indicates the eco-friendliness of the vehicle driving operation being performed by the driver; and a notification control unit that controls a notifying unit to notify the driver of the eco-drive support information, when there is a request from an input unit for notification of the eco-drive support information, the notification control unit controlling the notifying unit to notify the driver of the eco-drive support information though there is not a request from the input unit for notification of the eco-drive support information, when a predetermined eco-drive support information providing condition is satisfied.

BRIEF DESCRIPTION OF THE DRAWINGS

Other objects, features and advantages of the present invention will become more apparent from the following detailed description when read in conjunction with the accompanying drawings, in which:

FIG. 19 show schematic views showing an example of notification by the notifying unit in accordance with the ninth variation of the first embodiment.

DESCRIPTION OF EMBODIMENTS

The following is a description of embodiments of the present invention, with reference to the accompanying drawings.

Figure 1:
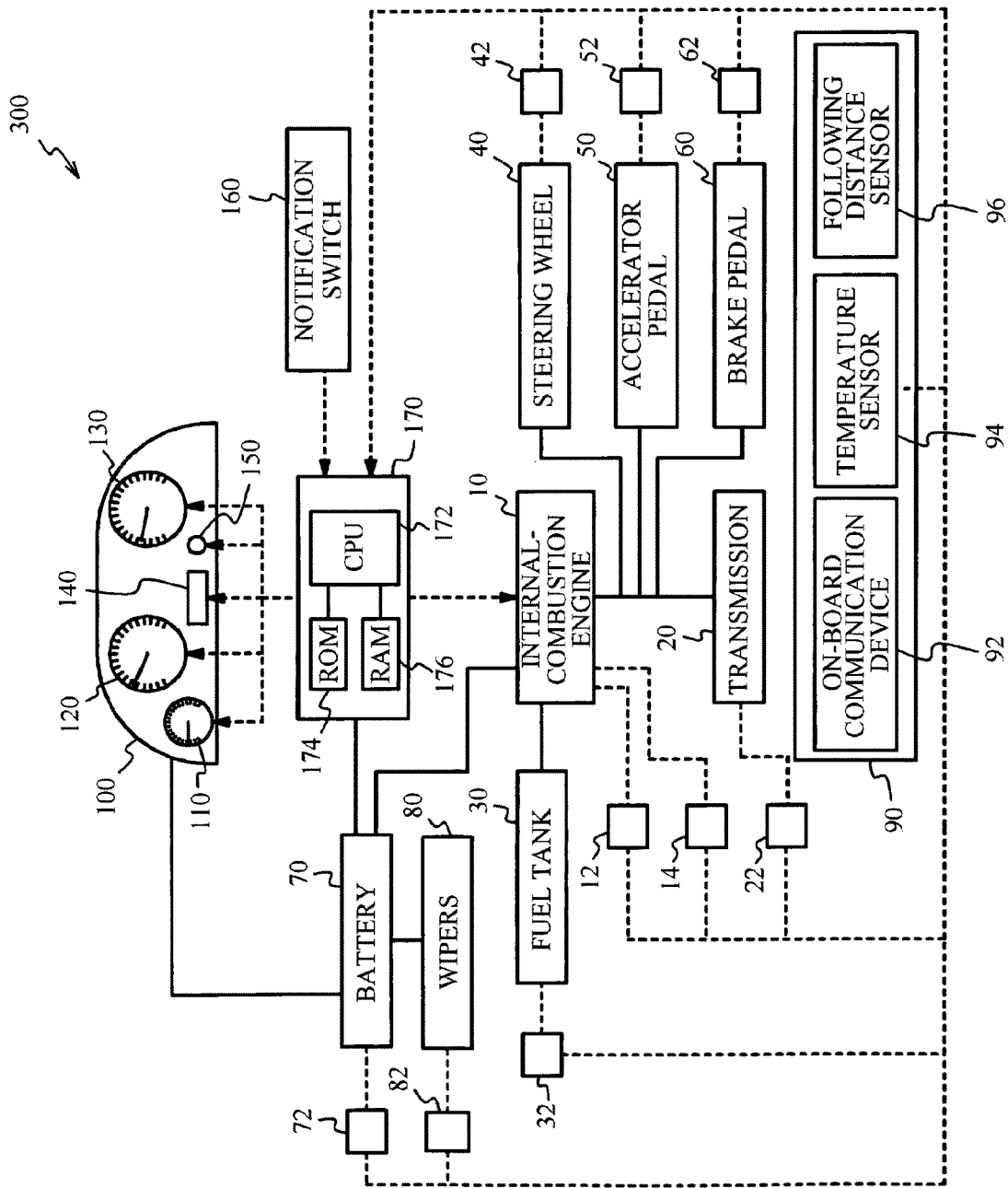
FIG. 1 is a block diagram schematically showing the entire structure of a vehicle into which an ECU in accordance with a first embodiment of the present invention is incorporated.

First, an eco-drive support device (ECU 170) in accordance with a first embodiment of the present invention is described. In this specification, "eco" refers to economy-conscious and/or ecology-conscious. Being economy-conscious is reducing fuel consumption (lowering fuel costs) and saving fuels. Being ecology-conscious is being environment-friendly by reducing the consumption of fossil fuels (such as gasoline) and restricting generation and emission of toxic substances and $CO_2$ caused by combustion of fossil fuels or the like. FIG. 1 is a block diagram schematically showing the entire structure of a vehicle 300 into which the ECU 170 in accordance with the first embodiment of the present invention is incorporated. As shown in FIG. 1, the vehicle 300 includes an internal-combustion engine 10, a transmission 20, a fuel tank 30, a steering wheel 40, an accelerator pedal 50, a brake pedal 60, a battery 70, windshield wipers 80, an external-information detection unit 90, a panel meter 100, an notification switch 160, and the ECU 170.

The internal-combustion engine 10 is not particularly specified, but may be a gasoline engine, a diesel engine, a hybrid engine formed by combining a gasoline engine or a diesel engine with an electric motor, or the like. The internal-combustion engine 10 has fuel supplied from the fuel tank 30. The spark plug of the internal-combustion engine 10 has electric power supplied from the battery 70.

A revolution sensor 12 is placed near the crankshaft of the internal-combustion engine 10. The revolution sensor 12 detects the number of revolutions of the internal-combustion engine 10, and notifies the ECU 170 of the detection result. A torque sensor 14 is placed on the output shaft of the internal-combustion engine 10. The torque sensor 14 detects the output torque of the internal-combustion engine 10, and notifies the ECU 170 of the detection result. If the internal-combustion engine 10 is a hybrid engine, a motor revolution sensor (not shown) is placed on the electric motor (not shown) of the hybrid engine. The motor revolution sensor detects the number of revolutions of the motor, and notifies the ECU 170 of the detection result.

The transmission 20 is connected to the output shaft (not shown) of the internal-combustion engine 10. Although not particularly limited, the transmission 20 may be an automatic transmission (AT), for example. When a shift lever (not shown) is operated, the transmission 20 changes the revolution speed of the output shaft of the internal-combustion engine 10 to a desired revolution speed. A vehicle speed sensor 22 is placed in the vicinity of the output shaft (not shown) of the transmission 20. The vehicle speed sensor 22 detects the vehicle speed based on the revolutions of the output shaft, and notifies the ECU 170 of the detection result.

The fuel tank 30 is connected to the internal-combustion engine 10 via a pipe (not shown). Fuel is stored in the fuel tank 30. The fuel tank 30 supplies fuel to the internal-combustion engine 10. A remaining fuel sensor 32 detects the remaining fuel level in the fuel tank 30, and notifies the ECU 170 of the detection result.

The steering wheel 40 is placed at the driver's seat (not shown) of the vehicle 300. The steering wheel 40 is connected to the front steering axle (not shown) of the vehicle 300. A steering angle sensor 42 is provided on the steering wheel 40. The steering angle sensor 42 detects the steering angle, and notifies the ECU 170 of the detection result.

The accelerator pedal 50 is placed at the driver's seat of the vehicle 300. The accelerator pedal 50 is connected to the throttle (not shown) of the vehicle 300. The accelerator pedal 50 is equipped with an accelerator angle sensor 52. The accelerator angle sensor 52 detects the angle of the accelerator pedal 50, and notifies the ECU 170 of the detection result.

The brake pedal 60 is provided at the driver's seat of the vehicle 300. The brake pedal 60 is connected to the brake (not shown) of the vehicle 300. The brake pedal 60 is equipped with a brake operation sensor 62. The brake operation sensor 62 detects the amount of brake operation, and notifies the ECU 170 of the detection result.

The battery 70 supplies electric power to the windshield wipers 80, the panel meter 100, and the ECU 170. The battery 70 is equipped with a remaining battery sensor 72. The remaining battery sensor 72 detects the remaining battery level, and notifies the ECU 170 of the detection result.

The windshield wipers 80 are placed on the windshield (not shown) on the driver's seat side (not shown). The pendular motion speed of the windshield wipers 80 is switched by a wiper speed switch (not shown). The wipers 80 are equipped with a wiper speed sensor 82. The wiper speed sensor 82 detects the wiper speed selected by the wiper speed switch, and notifies the ECU 170 of the detection result.

The external information detection unit 90 detects external information about the vehicle 300, and notifies the ECU 170 of the detection result. The external information detection unit 90 may include an on-board communication device 92, a temperature sensor 94, and a following distance sensor 96, for example. The on-board communication device 92 communicates with GPS artificial satellites, and obtains positional information about the vehicle 300. Based on map information (not shown), the on-board communication device 92 obtains road category information and the likes about the road on which the vehicle 300 is traveling. The on-board communication device 92 also communicates with communication devices placed on routes, and obtains weather information, route information from the outside of the vehicle 300, and the likes. Also, information for requesting the driver to be notified of eco-drive support information, such as a signal for requesting highly eco-conscious driving, may be supplied from the outside of the vehicle 300. The temperature sensor 94 detects the outside temperature of the vehicle 300. The following distance sensor 96 detects the distance from the vehicle traveling in front of the vehicle 300. For example, the following distance sensor 96 includes a radar device, and emits laser light to a predetermined range in front of the vehicle 300 at regular intervals. The following distance sensor 96 then receives the light reflected from the vehicle running in front of the vehicle 300, and determines the distance from the vehicle running in front of the vehicle 300.

The panel meter 100 is placed at the driver's seat. A fuel meter 110, a speed meter 120, a tachometer 130, a display 140, and a speaker 150 are arranged on the panel meter 100. The fuel meter 110 receives an instruction from the ECU 170, and displays the detection result of the remaining fuel sensor 32. The speed meter 120 receives an instruction from the ECU 170, and displays the detection result of the vehicle speed sensor 22. The tachometer 130 receives an instruction from the ECU 170, and displays the detection result of the revolution sensor 12.

The display 140 receives an instruction from the ECU 170, and displays vehicle information such as the travel distance, and eco-drive support information indicating the eco-consciousness in the driving of the vehicle 300 by the driver. The display 140 may be a liquid crystal display, for example. The operation of the display 140 will be described later in detail.

The speaker 150 emits sound in accordance with an instruction from the ECU 170. The display 140 and the speaker 150 function as a notification unit.

The notification switch 160 is placed in the vicinity of the shift lever (not shown) of the transmission 20, for example. The notification switch 160 determines whether there is a request from the driver for a notification of the eco-drive support information, and notifies the ECU 170 of the determination result. For example, the driver turns on the notification switch 160, to send a request for a notification of the eco-drive support information to the ECU 170. The driver turns off the notification switch 160, to send the ECU 170 a request that a notification of the eco-drive support information is not necessary. In this manner, the notification switch 160 functions as an input unit. The notification switch 160 is not particularly specified, as long as it is a switch that can be turned on and off. For example, a rocker switch may be used.

The ECU 170 is a computer that includes a CPU 172 (Central Processing Unit) 172 performing arithmetic operations, a ROM (Read Only Memory) 174 storing programs and the likes, and a RAM (Random Access Memory) 176 storing data and the likes. The ECU 170 controls the ignition timing and the likes of the internal-combustion engine 10, and also controls displays and the likes of the panel meter 100 in a comprehensive manner.

In this embodiment, the ECU 170 also functions as an eco-drive support device. The ECU 170 reads detection results from the revolution sensor 12, the torque sensor 14, the vehicle speed sensor 22, the remaining fuel sensor 32, the steering angle sensor 42, the accelerator angle sensor 52, the brake operation sensor 62, the remaining battery sensor 72, and the wiper speed sensor 82 (those sensors will be hereinafter referred to collectively as the various sensors), and detection results from the external information detection unit 90, and detection results from the notification switch 160. The ECU 170 processes those detection results at the CPU 172, and comprehensively controls the operation of the display 140 and the operation of the speaker 150.

In FIG. 1, the ECU 170 may be an engine ECU that controls the internal-combustion engine 10, or may be an integrated ECU that controls the vehicle 300 in an integrative manner. The control on displays of the panel meter 100 may be performed directly by the ECU 170. Alternatively, a meter ECU that displays meters may be provided, and the control on displays may be performed through the meter ECU. As a notification unit for displaying the eco-drive support information, it is possible to use not only the meter panel 100, but also other various display devices provided on the vehicle 300 such as a car navigation system. Signals may be input directly to the ECU 170 (such as an engine ECU) from the various sensors provided in the vehicle 300, or may be input to the ECU 170 via ECUs that use the respective sensors. For example, a signal from the steering angle sensor 42 may be input via an electric power steering ECU.

Figure 2:
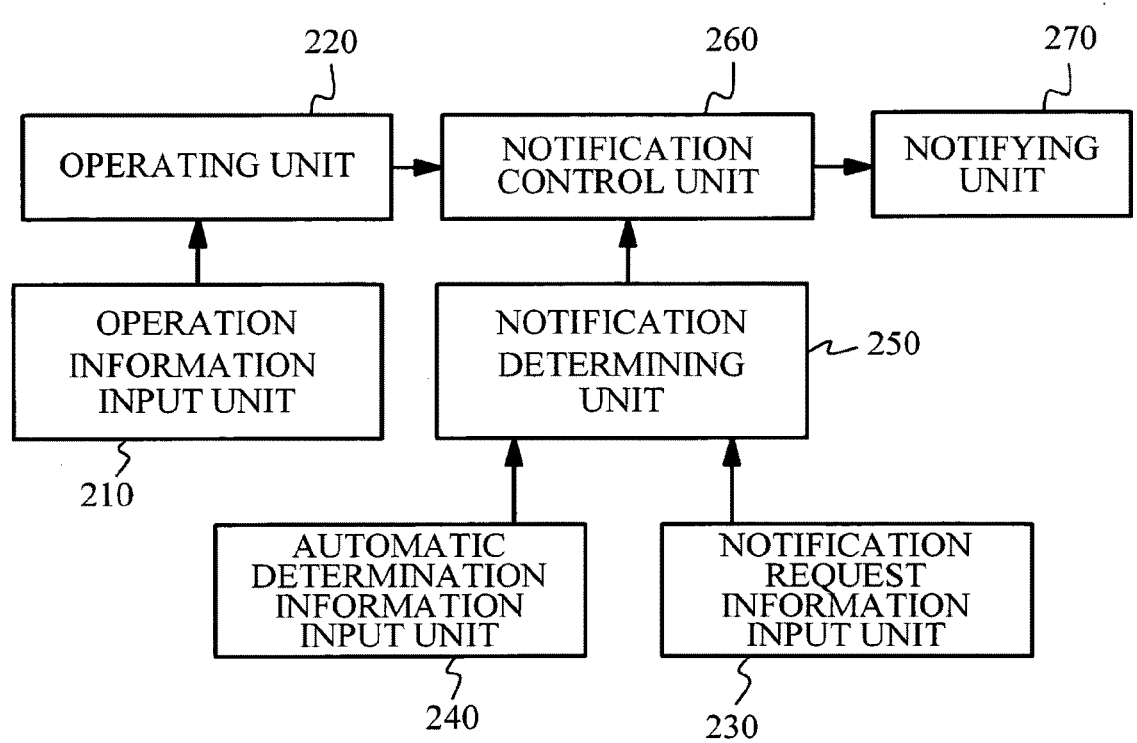
FIG. 2 is a functional block diagram for explaining the functions of the eco-drive support device in accordance with the first embodiment.

FIG. 2 is a functional block diagram for explaining the functions of the eco-drive support device (the ECU 170). In FIG. 2, an operation information input unit 210 detects the operation information necessary for an operating unit 220 to calculate the eco-drive support information, and inputs the detection result to the operating unit 220. The operation information input unit 210 is equivalent to the various sensors shown in FIG. 1.

The operating unit 220 obtains the operation information from the operation information input unit 210, and calculates the eco-drive support information. The operating unit 220 then transmits the operation result or the eco-drive support information to a notification control unit 260. The operating unit 220 functions as an operation unit for the eco-drive support device. The operating unit 220 is equivalent to the ECU 170 shown in FIG. 1.

A notification request information input unit 230 determines whether there is a request from the driver for a notification of the eco-drive support information, and inputs the detection result to a notification determining unit 250. The notification request information input unit 230 is equivalent to the notification switch 160 shown in FIG. 1.

An automatic determination information input unit 240 inputs the information necessary for the notification determining unit 250 to determine whether the driver is to be notified of the operation result of the operating unit 220, except for the information from the notification switch 160. The automatic determination information input unit 240 is equivalent to the various sensors and the external information detection unit 90 shown in FIG. 1.

The notification determining unit 250 obtains the information from the notification request information input unit 230 and the information from the automatic determination information input unit 240. The notification determining unit 250 then determines whether to notify the driver of the operation result of the operating unit 220, and transmits the determination result to the notification control unit 260.

More specifically, the notification determining unit 250 receives the information from the notification request information input unit 230 and the information from the automatic determination information input unit 240. The notification determining unit 250 then determines whether there is a notification request from the driver. If there is a notification request from the driver, the notification determining unit 250 determines that the driver is to be notified of the operation result of the operating unit 220, and transmits the determination result to the notification control unit 260. If the notification determining unit 250 determines that there is not a notification request from the driver, the notification determining unit 250 determines whether predetermined conditions for providing the eco-drive support information are satisfied. If the notification determining unit 250 determines that the predetermined conditions for providing the eco-drive support information are satisfied, the notification determining unit 250 then determines that the driver is to be notified of the operation result of the operating unit 220. If the notification determining unit 250 determines that the predetermined conditions for providing the eco-drive support information are not satisfied, the notification determining unit 250 then determines that the driver is not to be notified of the operation result of the operating unit 220. The notification determining unit 250 transmits the determination result to the notification control unit 260. The notification determining unit 250 is equivalent to the ECU 170 shown in FIG. 1. The notification determining unit 250 functions as a notification control unit of the eco-drive support device.

Based on the determination result supplied from the notification determining unit 250, the notification control unit 260 controls the operation of a notifying unit 270. More specifically, if the notification determining unit 250 determines that the driver is to be notified of the operation result of the operating unit 220, the notification control unit 260 controls the notifying unit 270 to notify the driver of the operation result of the operating unit 220. If the notification determining unit 250 determines that the driver is not to be notified of the operation result of the operating unit 220, the notification control unit 260 controls the notifying unit 270 not to notify the driver of the operation result of the operating unit 220. The notification control unit 260 is equivalent to the ECU 170 shown in FIG. 1. The notification control unit 260 functions as a notification control unit of the eco-drive support device.

In accordance with the instruction from the notification control unit 260, the notifying unit 270 notifies the driver of the operation result of the operating unit 220 or the eco-drive support information. The notifying unit 270 is equivalent to the display 140 and the speaker 150 shown in FIG. 1. The notifying unit 270 functions as a notification unit.

In FIG. 2, the operating unit 220, the notification determining unit 250, and the notification control unit 260 are formed with the ECU 170 (or an engine ECU), but are not limited to that structure. For example, the operating unit 220, the notification determining unit 250, and the notification control unit 260 may be formed with ECUs that are independent of each other. More specifically, the operating unit 220 and the notification determining unit 250 may be formed with engine ECUs, and the notification control unit 260 may be formed with a meter ECU. Alternatively, the operating unit 220 may be formed with an engine ECU, and the notification determining unit 250 and the notification control unit 260 may be formed with meter ECUs.

Figure 3:
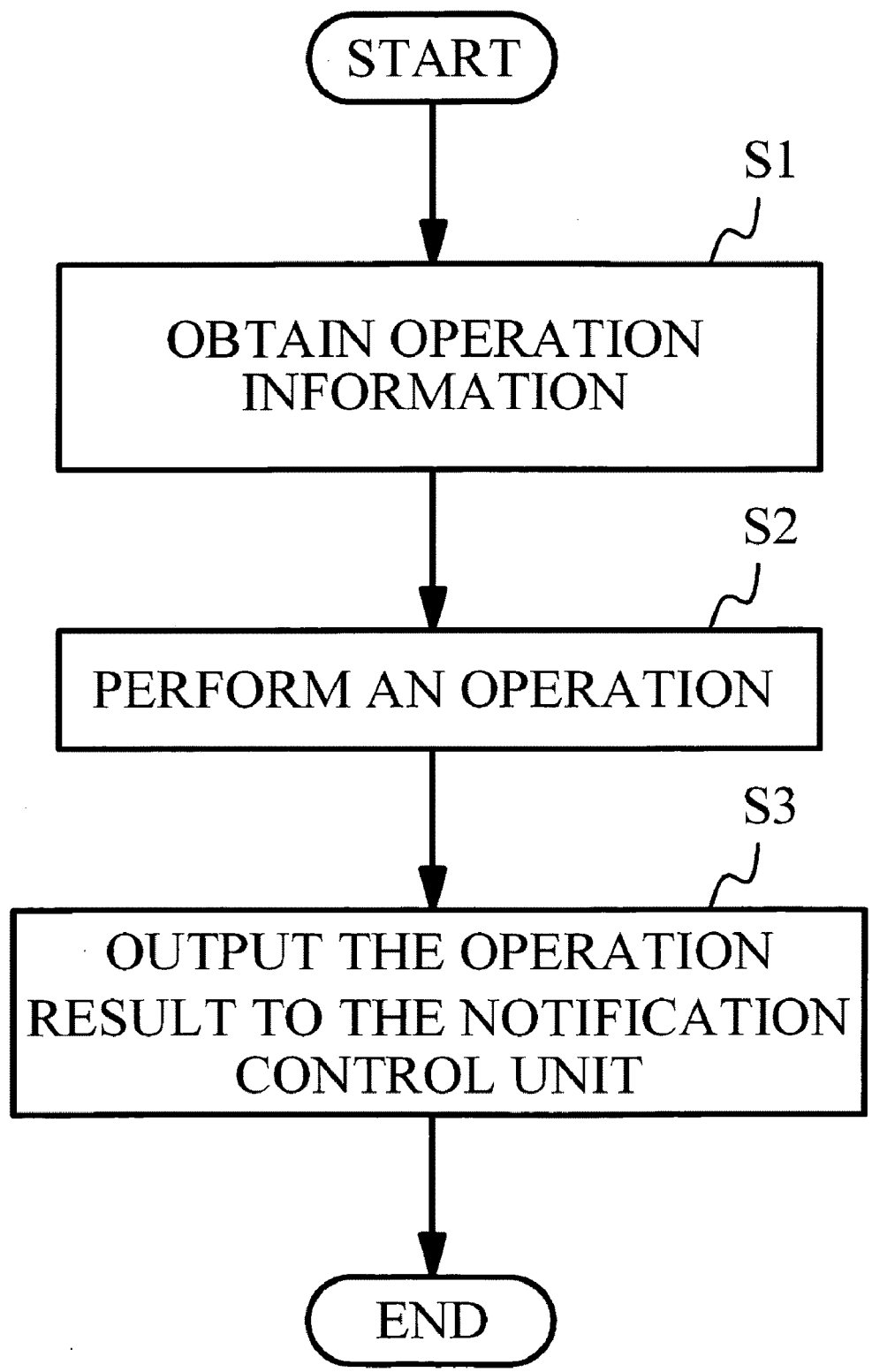
FIG. 3 is an example flowchart showing an operation to be performed by the operating unit of the ECU in accordance with the first embodiment.

FIG. 3 is an example flowchart showing an operation to be performed by the operating unit 220 of the ECU 170 in accordance with the first embodiment. First, the operating unit 220 obtains operation information from the operation information input unit 210 (step S1). For example, the operating unit 220 receives the vehicle speed and the accelerator pedal angle from the vehicle speed sensor 22 and the accelerator angle sensor 52, respectively.

The operating unit 220 then calculates the eco-drive support information (step S2). For example, the operating unit 220 stores a map indicating a driving operation equivalent to a fuel-saving driving operation. The operating unit 220 then compares the operation information obtained from the operation information input unit 210 with the map indicating the driving operation equivalent to a fuel-saving driving operation. In doing so, the operating unit 220 performs an operation to determine whether the driving operation by the driver is a fuel-saving driving operation. If the driving operation by the driver is a fuel-saving driving operation, the driving operation by the driver is regarded as a highly eco-conscious driving operation.

For example, the operating unit 220 stores a map that shows the relation between the accelerator pedal angle and the vehicle speed to be used as the criteria for determining whether a fuel-saving driving operation is to be performed. The operating unit 220 then compares the accelerator pedal angle and the vehicle speed obtained from the operation information input unit 210 with the accelerator pedal angle and the vehicle speed shown in the map. The operating unit 220 calculates the excess amount from the accelerator pedal angle obtained from the operation information input unit 210 and the accelerator pedal angle in a fuel-saving driving operation. If the excess amount of the accelerator pedal angle exceeds 0%, the driving operation by the driver is not a fuel-saving driving operation. If the excess amount of the accelerator pedal angle is 0%, the driving operation by the driver is a fuel-saving driving operation. The excess amount of the acceleration is equivalent to the eco-drive support information. When the excess amount of the accelerator pedal angle is 0%, the eco-consciousness in the eco-drive support information is regarded as high.

The operating unit 220 then outputs the operation result to the notification control unit 260 (step S3). For example, the operating unit 220 outputs the excess amount of the acceleration pedal angle to the notification control unit 260. The operating unit 220 then ends the operation shown in the flowchart. The operating unit 220 repeatedly carries out the procedures of steps S1 through S3 at regular intervals.

Figure 4:
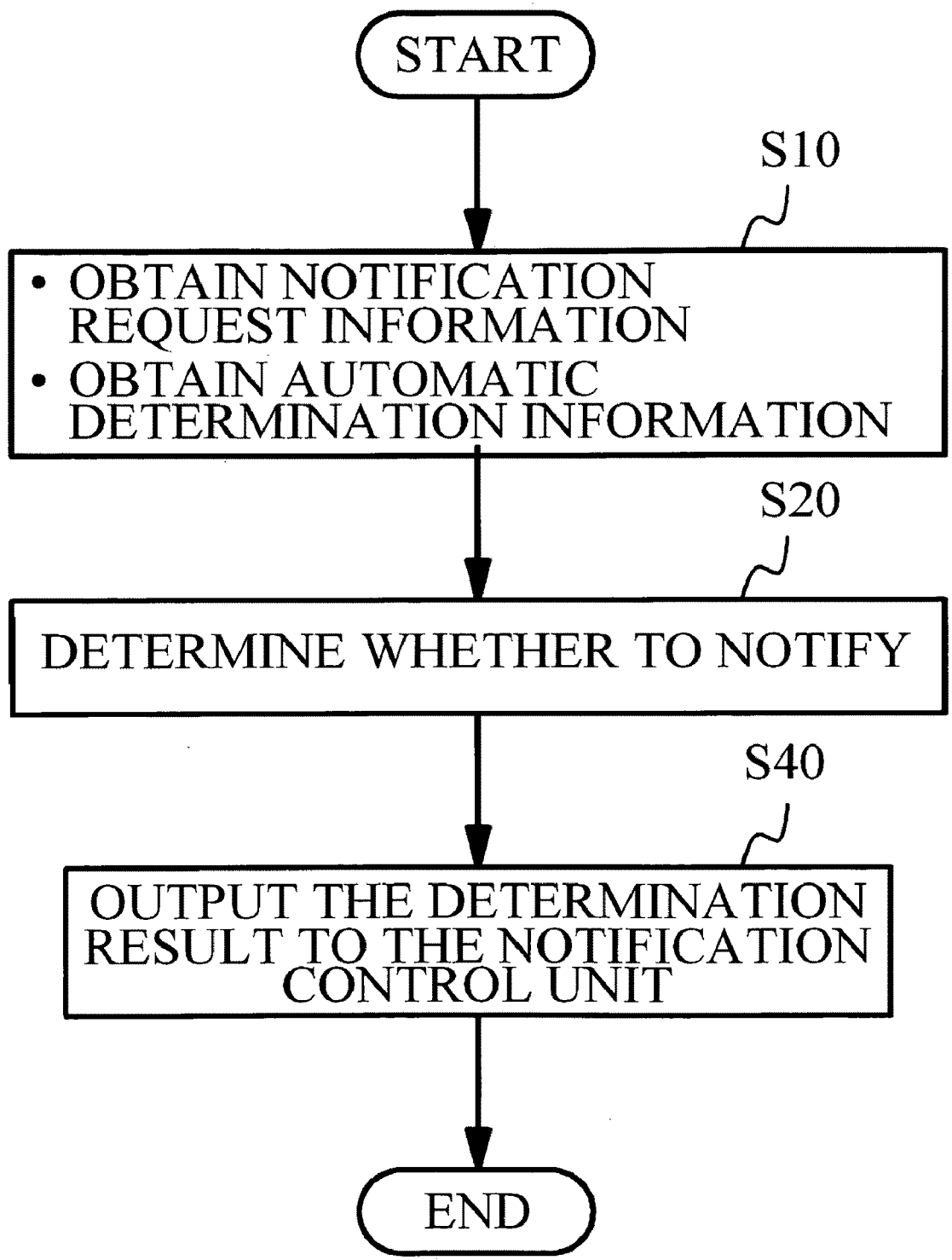
FIG. 4 is an example flowchart showing an operation to be performed by the notification determining unit of the ECU in accordance with the first embodiment.

FIG. 4 is an example flowchart showing an operation to be performed by the notification determining unit 250 of the ECU 170 in accordance with the first embodiment. First, the notification determining unit 250 obtains information from the notification request information input unit 230 and the automatic determination information input unit 240 (step S10). The notification determining unit 250 then determines whether the driver is to be notified of the operating result of the operating unit 220 (step S20). The notification determining unit 250 outputs the result of the determination made in step S20 to the notification control unit 260 (step S40). The notification determining unit 250 then ends the operation shown in the flowchart. The notification determining unit 250 repeatedly carries out the steps S10 through S40 at regular intervals.

Figure 5:
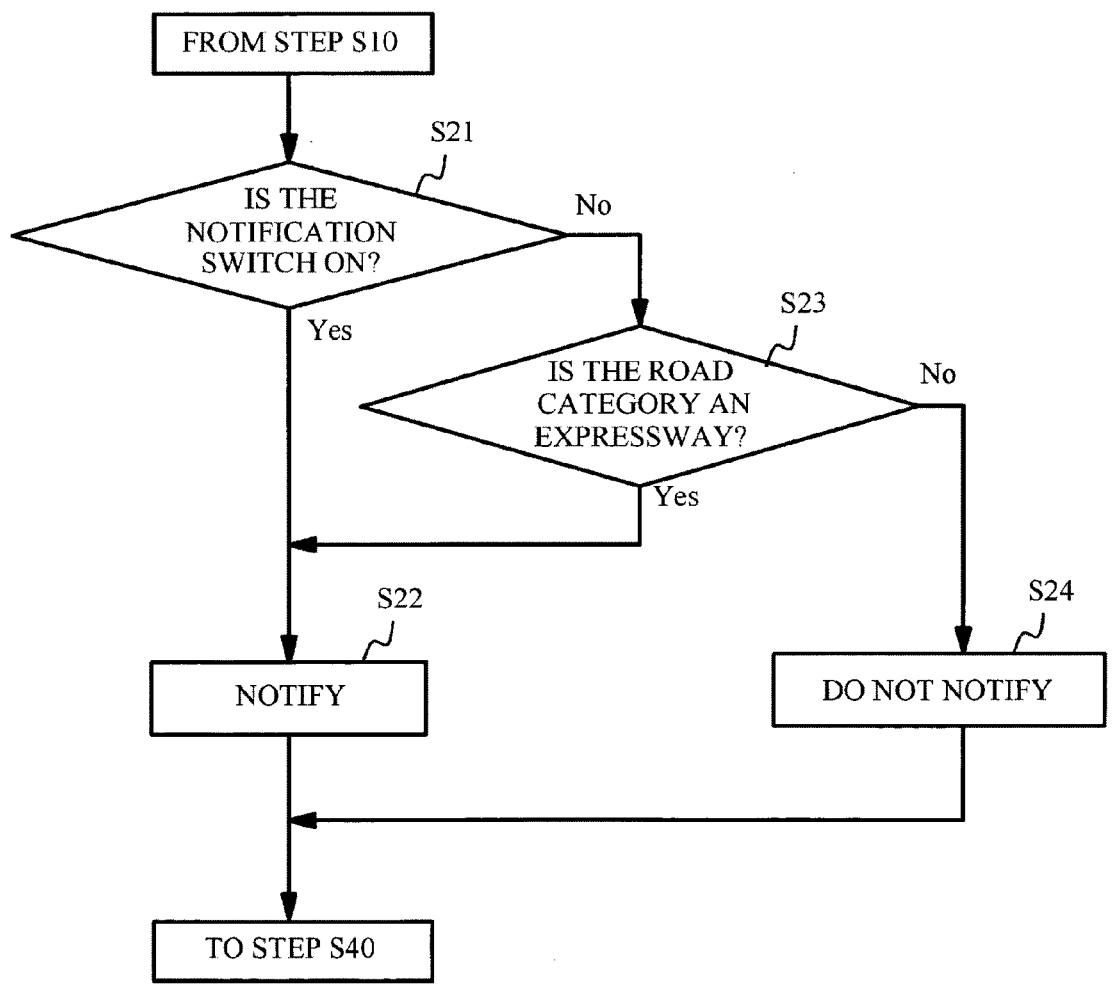
FIG. 5 is a flowchart for further explaining the procedure (step S20) to be carried out by the notification determining unit of FIG. 4 to determine whether the driver is to be notified of an operation result of the operating unit.

FIG. 5 is a flowchart further showing the procedure (step S20) of FIG. 4 to be carried out by the notification determining unit 250 to determine whether the driver is to be notified of the operation result of the operating unit 220. First, the notification determining unit 250 determines whether there is a request from the driver for a notification of the operation result of the operating unit 220 (step S21). For example, the notification determining unit 250 determines whether the notification switch 160 has been turned on. If the notification switch is determined to be on, the notification determining unit 250 determines that there is a request from the driver for a notification of the operation result of the operating unit 220. If the notification switch is determined to be off, the notification determining unit 250 determines that there is not a request from the driver for a notification of the operation result of the operating unit 220.

If the notification determining unit 250 determines in step S21 that the notification switch 160 has been turned on, or that there is a request from the driver for a notification of the operation result of the operating unit 220, the notification determining unit 250 determines that the driver is to be notified of the operation result (step S22). The notification determining unit 250 next carries out the procedure of step S40.

If the notification determining unit 250 determines in step S21 that the notification switch 160 has not been turned on, or that there is not a request from the driver for a notification of the operation result of the operating unit 220, the notification determining unit 250 next determines whether the predetermined conditions for providing the eco-drive support information are satisfied (step S23). If the conditions for providing the eco-drive support information are satisfied, a notification of the eco-drive support information is made when the operation result of the operating unit 220 is likely to exhibit high eco-consciousness in the eco-drive support information.

In a case where the operation result of the operating unit 220 is likely to exhibit high eco-consciousness in the eco-drive support information, the driver's motivation for a highly eco-conscious driving operation and a notification of the eco-drive support information can be increased by automatically notifying the driver of the eco-drive support information. As a result, the driver spontaneously turns on the notification switch 160. In a case where the operation result of the operating unit 220 is likely to exhibit low eco-consciousness in the eco-drive support information, the driver's motivation for a highly eco-conscious driving operation and a notification of the eco-drive support information might be decreased, if the driver is automatically notified of the eco-drive support information. In that case, the driver might become more reluctant to turn on the notification switch 160.

For example, the notification determining unit 250 determines whether the road on which the vehicle 300 is traveling is highly eco-friendly. More specifically, the notification determining unit 250 determines whether the road on which the vehicle 300 is traveling is suitable for a fuel-saving driving operation. If the road on which the vehicle 300 is traveling is suitable for a fuel-saving driving operation, a fuel-saving driving operation should be performed so as to improve eco-friendliness in the motorized society. In other words, a road suitable for a fuel-saving driving operation is regarded as a highly eco-friendly road. In this case, the operation result of the operating unit 220 is considered to be likely to exhibit high eco-friendliness in the eco-drive support information. More specifically, the notification determining unit 250 receives the road category information from the automatic determination information input unit 240. The notification determining unit 250 then determines whether the road category information indicates that the road is an expressway. If the road on which the vehicle 300 is traveling is an expressway, a fuel-saving driving operation is easy, and the road is regarded as suitable for a fuel-saving driving operation.

If the determination result of step S23 shows that the road category information indicates that the road is an expressway, the notification determining unit 250 determines that the driver is to be notified of the operation result of the operating unit 220 (step S22).

If the determination result of step S23 shows that the road category information does not indicate an expressway, the notification determining unit 250 determines that the driver is not to be notified of the operation result of the operating unit 220 (step S24). The notification determining unit 250 then carries out the procedure of step S40.

Figure 6:
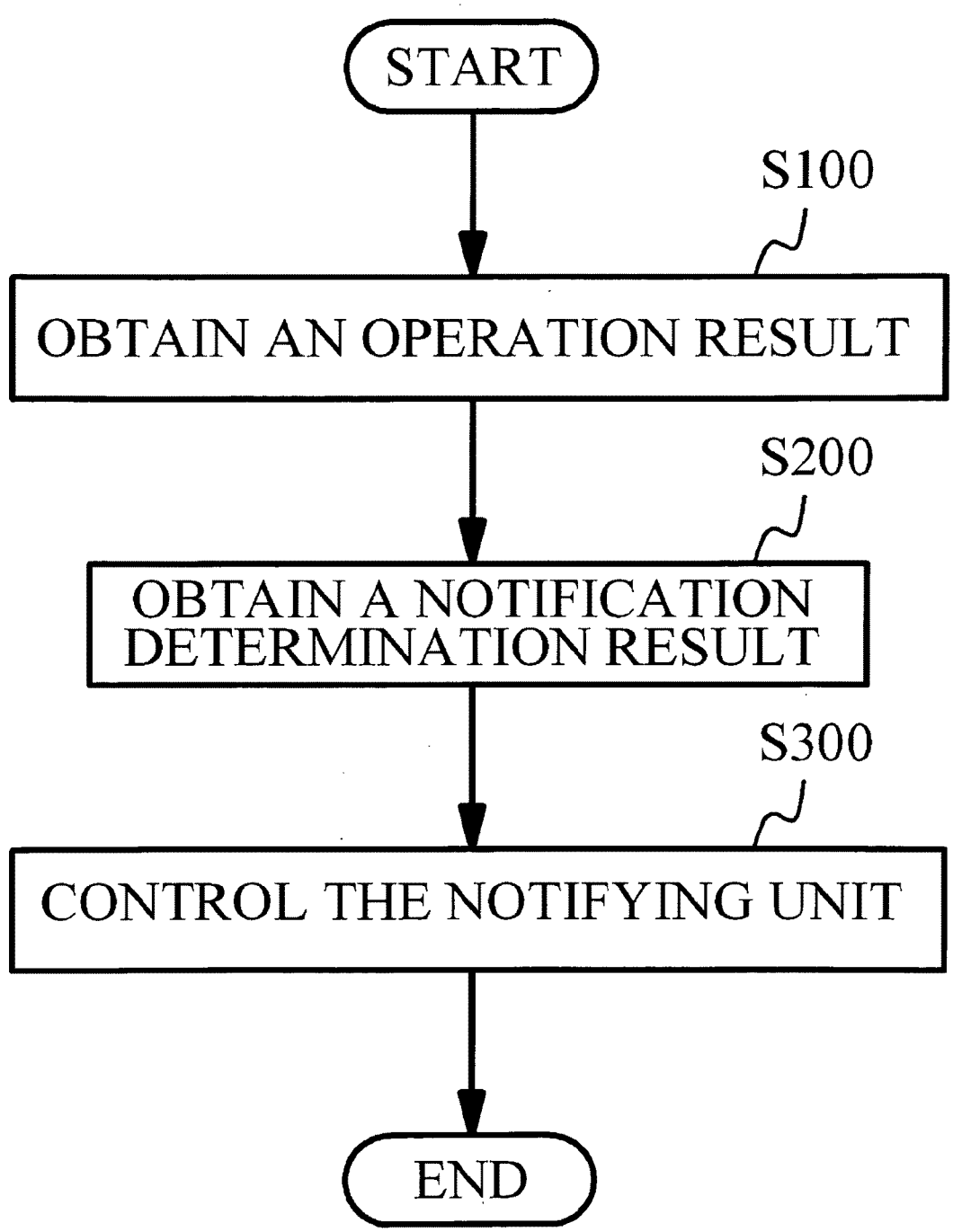
FIG. 6 is an example flowchart showing an operation to be performed by the notification control unit in accordance with the first embodiment.

FIG. 6 is an example flowchart showing an operation to be performed by the notification control unit 260 of the ECU 170 in accordance with the first embodiment. First, the notification control unit 260 obtains an operation result from the operating unit 220 (step S100). For example, the notification control unit 260 obtains the operation result that is output from the operating unit 220 in step S3 of FIG. 3.

The notification control unit 260 then obtains a determination result from the notification determining unit 250 (step S200). For example, the notification control unit 260 obtains the determination result that is output from the notification determining unit 260 in step S40 of FIG. 4.

Based on the determination result obtained from the notification determining unit 250 in step S200, the notification control unit 260 controls the operation of the notifying unit 270 (step S300). For example, if the determination result obtained from the notification determining unit 250 in step S200 indicates that the driver is to be notified of the operation result of the operating unit 220, the notification control unit 260 controls the notifying unit 270 so that the driver is notified of the operation result obtained in step S100. If the determination result obtained from the notification determining unit 250 in step S200 indicates that the driver is not to be notified of the operation result of the operating unit 220, the notification control unit 260 controls the notifying unit 270 so that the driver is not notified of the operation result obtained in step S100. The notification control unit 260 then ends the operation shown in the flowchart. The notification control unit 260 repeatedly carries out the steps S100 through S300 at regular intervals.

Figure 7:
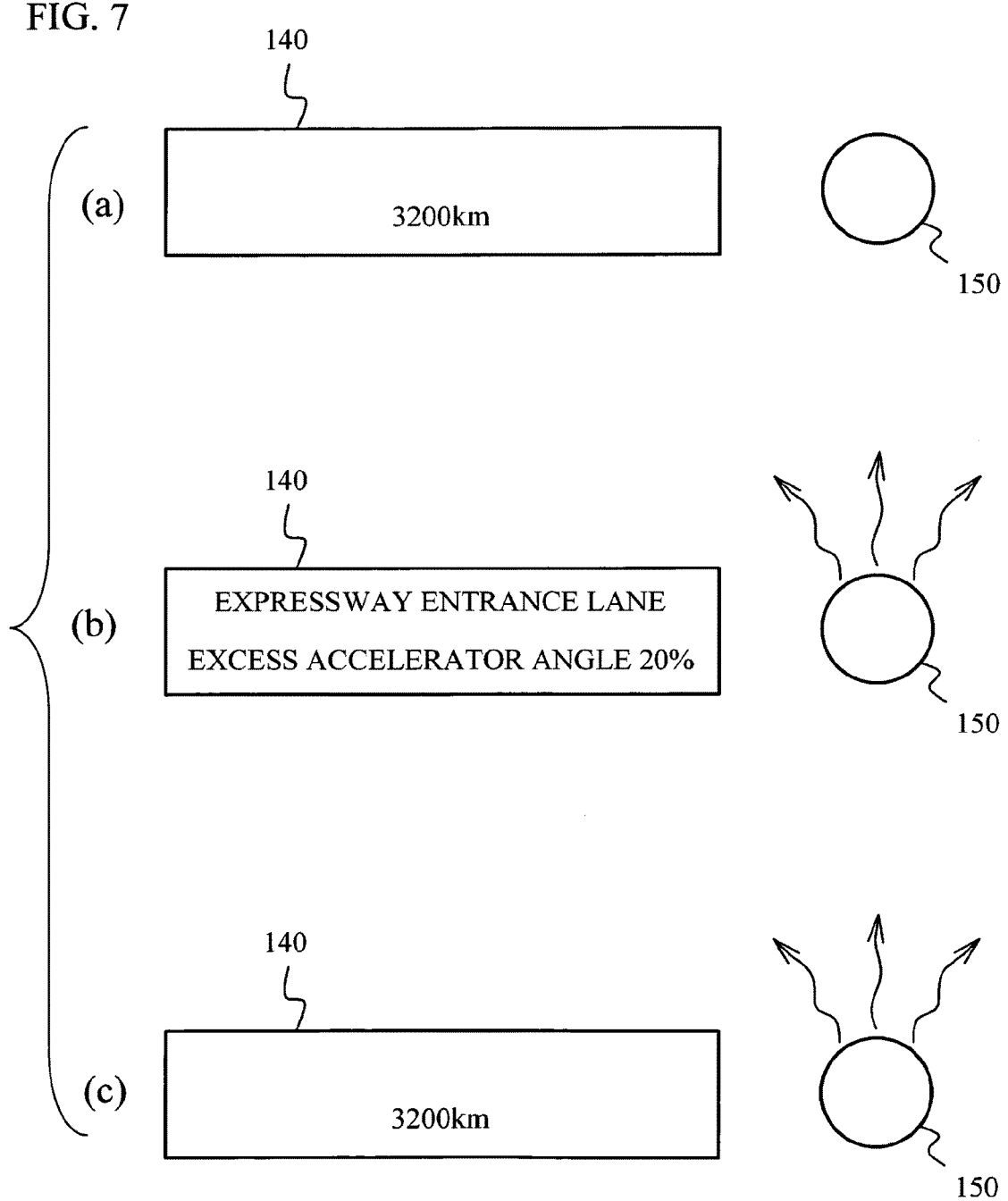
FIG. 7 show schematic views showing an example of notification by the notifying unit in accordance with the first embodiment.

FIG. 7 show schematic views showing an example of notification by the notifying unit 270 in accordance with the first embodiment. FIG. 7(a) is a schematic view showing the state of the notifying unit 270 observed before a start of notification of an operation result. As shown in FIG. 7(a), the travel distance of the vehicle 300 is displayed on the display 140 before notification of an operation result is started, for example. The speaker 150 is not emitting any sound.

FIG. 7(b) is a schematic view showing the state of the notifying unit 270 observed when notification of an operation result is started. As shown in FIG. 7(b), if notification of an operation result is started, or if the notification determining unit 250 determines that the driver is to be notified of the operation result of the operating unit 220, the display contents of the display 140 are changed to a display of the eco-drive support information (hereinafter referred to as the "eco-navigation display"). For example, the operation result of the operating unit 220 is displayed on the lower half of the display 140. If the operating unit 220 determines that the excess amount of the accelerator angle of the driver is 20&, or if the operating unit 220 determines that the accelerator operation by the driver is not a fuel-saving driving operation, "excess accelerator angle 20%" is displayed on the lower half of the display 140. If the operating unit 220 determines that the excess amount of the accelerator angle of the driver is 0%, or if the operating unit 220 determines that the accelerator operation by the driver is a fuel-saving driving operation, "excess accelerator angle 0%" is displayed on the lower half of the display 140.

The reason that the notification determining unit 250 determines that the driver is to be notified of the operation result of the operating unit 220 is displayed on the upper half of the display 140. For example, if the notification determining unit 250 determines that the driver is to be notified of the operation result of the operating unit 220 as the driver has turned on the notification switch 160, "switch ON" (not shown) is displayed on the upper half of the display 140, and at the same time, a voice message announcing that "the eco-navigation display has started" is emitted from the speaker 150.

If the notification determining unit 250 determines that the driver is to be notified of the operation result of the operating unit 220 as the road category information indicates that the road is an expressway though the notification switch 160 is off, "on expressway" is displayed on the upper half of the display 140. Accordingly, the driver can be informed of the reason that the display 140 is switched to the eco-navigation display, though the driver has not turned on the notification switch 160. If the notification determining unit 250 determines that the driver is to be notified of the operation result of the operating unit 220 as the road category information indicates that the road is an expressway though the notification switch 160 is off, a voice message announcing that "the eco-navigation has started" is also emitted from the speaker 150. Accordingly, the driver can be aware that the display 140 has been switched to the eco-navigation display, though the driver has not turned on the notification switch 160.

FIG. 7(c) is a schematic view showing the state of the notifying unit 270 observed when notification of an operation result is ended. As shown in FIG. 7(c), if the notification determining unit 250 determines that the driver is not to be notified of the operation result of the operating unit 220 since the road category information indicates that the road is not an expressway after the vehicle 300 exits an expressway, the notification control unit 260 controls the notifying unit 270 so as to end the notification of the operation result. In this case, the display content (the travel distance) displayed before the start of the notification of the operation result is displayed again on the lower half of the display 140, for example. A voice message announcing that "the eco-navigation has ended" is emitted from the speaker 150. Accordingly, the driver can be aware that the notification of the operation result has ended.

Figure 8:
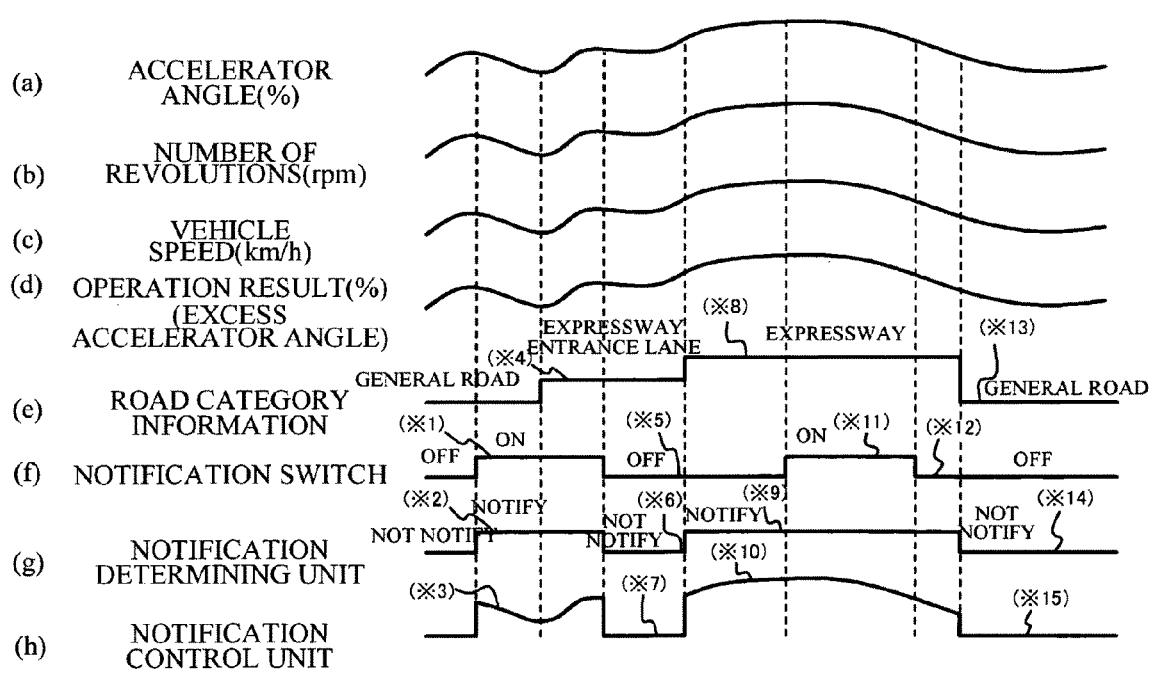
FIG. 8 is a timing chart illustrating example operations to be performed by the ECU in accordance with the first embodiment.

FIGS. 8(a) through 8(h) are timing charts illustrating example operations to be performed by the ECU 170 in accordance with the first embodiment. FIG. 8(a) shows a detection result of the accelerator angle sensor 52. FIG. 8(b) shows a detection result of the revolution sensor 12. FIG. 8(c) shows a detection result of the vehicle speed sensor 22. FIG. 8(d) shows an operation result (the excess amount of the accelerator angle) of the operating unit 220. FIG. 8(e) shows a detection result (the road category information) of the external information detection unit 90. FIG. 8(f) shows a detection result of the notification switch 160. FIG. 8(g) shows a determination result of the notification determining unit 250. FIG. 8(h) shows control contents of the notification control unit 260.

A case where the vehicle 300 enters an expressway through an entrance lane to the expressway from a general road, and exits the expressway after a predetermined period of traveling on the expressway is now described. In this case, the road category information varies from the general road to the expressway entrance lane, to the expressway, and to a general road, as shown in FIG. 8(e). The accelerator operation by the driver varies with the road category information. The detection result of the accelerator angle sensor 52 shown in FIG. 8(a) varies with the variation of the accelerator operation by the driver. The detection result of the revolution sensor 12 shown in FIG. 8(b) and the detection result of the vehicle speed sensor 22 shown in FIG. 8(c) vary with the variation of the detection result of the accelerator angle sensor 52 shown in FIG. 8(a). The operation result of the operating unit 220 shown in FIG. 8(d) also varies with the variations of the detection result of the accelerator angle sensor 52 and the detection result of the vehicle speed sensor 22.

If the driver switches on the notification switch 160 as shown in FIG. 8(f) (*1) while the road category information shown in FIG. 8(e) indicates that the road is a general road, the notification determining unit 250 determines that the driver is to be notified of the operation result of the operating unit 220 (*2). As a result, the notification control unit 260 controls the notifying unit 260 so that the driver is notified of the operation result of the operating unit 220, as shown in FIG. 8(h) (*3). Accordingly, the reason of the judgment (switch ON) and the operation result (the excess amount of the accelerator angle) are displayed on the display 140 of the notifying unit 270, for example. Also, a voice message announcing that "the eco-navigation display has started" is emitted from the speaker 150 of the notifying unit 270.

When the road category information switches to the expressway entrance lane as shown in FIG. 8(e) (*4), the driver switches off the notification switch 160 as shown in FIG. 8(f) (*5). In this case, the notification determining unit 250 determines that the conditions for providing the eco-drive support information are not satisfied, and that the driver is not to be notified of an operation result, as shown in FIG. 8(g) (*6). When entering the expressway entrance lane, the vehicle 300 needs to increase its speed. Therefore, the notification determining unit 250 determines that the expressway entrance lane is a road not suitable for a fuel-saving driving operation, or a road with low eco-friendliness. As a result, the notification control unit 260 controls the notifying unit 270 so that the driver is not to be notified of the operation result of the operating unit 220, as shown in FIG. 8(h) (*7). For example, the display content (the travel distance) displayed before the eco-navigation is displayed is brought back on the display 140 of the notifying unit 270. At the same time, a voice message announcing that "the eco-navigation display has ended" is emitted from the speaker 150 of the notifying unit 270.

When the road category information switches to the expressway as shown in FIG. 8(e) (*8), the notification determining unit 250 determines that the conditions for providing the eco-drive support information are satisfied, and that the driver is to be notified of the operation result as shown in FIG. 8(g) (*9), though the notification switch 160 is off as shown in FIG. 8(f) (*5). Since the expressway is regarded suitable for a fuel-saving driving operation, the notification determining unit 250 determines that the expressway is a road with high eco-friendliness. As a result, the notification control unit 260 controls the notifying unit 270 so that the driver is notified of the operation result of the operating unit 220 as shown in FIG. 8(h) (*10). For example, "expressway entrance lane" and "excess accelerator angle" are displayed on the display 140 of the notifying unit 270. Also, a voice message announcing that "the eco-navigation display has started" is emitted from the speaker 150 of the notifying unit 270.

If the notification switch 160 is switched on as shown in FIG. 8(f) (*11) while the road category information indicates that the road is the expressway as shown in FIG. 8(e), the notification determining unit 250 determines that the driver is to be notified of the operation result of the operating unit 220 as shown in FIG. 8(g) (*9). In this case, the notification control unit 260 controls the notifying unit 270 so that the notification of the operation result of the operating unit 220 is continued as shown in FIG. 8(h) (*10). Accordingly, the display of "expressway entrance lane" and "excess accelerator angle" is continued on the display 140 of the notifying unit 270.

If the notification switch 160 is switched off as shown in FIG. 8(f) (*12) while the road category information indicates that the road is the expressway as shown in FIG. 8(e), the notification determining unit 250 determines that the driver is to be notified of the operation result as shown in FIG. 8(g)

(*9). As a result, the notification control unit 260 controls the notifying unit 270 so that the notification of the operation result of the operating unit 220 is continued as shown in FIG. 8(h) (*10). Accordingly, the display of "expressway entrance lane" and "excess accelerator angle" is continued on the display 140 of the notifying unit 270.

When the road category information switches to a general road as shown in FIG. 8(e) (*13), the notification determining unit 250 determines whether the conditions for providing the eco-drive support information are satisfied, and determines whether the driver is to be notified of the operation result, as shown in FIG. 8(g). Here, the notification determining unit 250 determines that the general road is not a road suitable for a fuel-saving driving operation, and that the driver is not to be notified of the operation result (*14). In this case, the notification control unit 260 controls the notifying unit 270 so that the driver is not notified of the operation result of the operating unit 220 (*15). Accordingly, the display content (the travel distance) displayed before the eco-navigation is displayed is brought back on the display 140 of the notifying unit 270. Also, a voice message announcing that "the eco-navigation display has ended" is emitted from the speaker 150.

The ECU 170 in accordance with this embodiment includes the notification determining unit 250 as shown in FIG. 2. Accordingly, even when there is not a request for notification of the eco-drive support information from the notification request information input unit 230, the notifying unit 270 can be controlled to notify the driver of the eco-drive support information, if the predetermined conditions for providing the eco-drive support information are satisfied. More specifically, even when the notification switch 160 is not on, the notifying unit 270 can be controlled to notify the driver of the operation result of the operating unit 220, if the road on which the vehicle 300 is traveling is an expressway. As a result, even a driver who is not aware that the eco-drive support device is mounted on the vehicle 300 or a driver who is not interested in improving eco-consciousness in the motorized society can be notified of the eco-drive support information. Thus, the eco-consciousness in the motorized society can be improved.

In step S23 of FIG. 5, the road on which the vehicle 300 is traveling may be determined to be suitable for a fuel-saving driving operation, depending not only on whether the road information indicates that the road is an expressway, but also on whether the road information indicates a predetermined national route number, the road information indicates a predetermined route name, the road information indicates a predetermined area name, or the like.

Alternatively, to determine whether the road on which the vehicle 300 is traveling is suitable for a fuel-saving driving operation, lane information may be used. If the lane information indicates a cruising lane, for example, the vehicle 300 can travel at a constant speed more easily than in a case where the lane information indicates a fast lane. Accordingly, the cruising lane is regarded as suitable for a fuel-saving driving operation.

To determine whether the road on which the vehicle 300 is traveling is suitable for a fuel-saving driving operation, road width information may also be used. For example, a road with a great width is regarded as a road having fewer traffic signs such as a stop sign than a road with a small width. Accordingly, the vehicle 300 can easily maintain a constant speed on a road with a great width. Thus, a road with a great width is regarded as suitable for a fuel-saving driving operation.

To determine whether the road on which the vehicle 300 is traveling is suitable for a fuel-saving driving operation, route guide information may also be used. If the route guide information indicates a road that gives priority to the vehicle 300 on which a fuel-saving driving operation is being performed, for example, the road on which the vehicle 300 is traveling is regarded as suitable for a fuel-saving driving operation.

To determine whether the road on which the vehicle 300 is traveling is suitable for a fuel-saving driving operation, traffic information may also be used. If there is not a traffic jam on the road on which the vehicle 300 is traveling, for example, the road is regarded as suitable for a fuel-saving driving operation.

To determine whether the road on which the vehicle 300 is traveling is suitable for a fuel-saving driving operation, time and date information may also be used. Days regarded as suitable for a fuel-saving driving operation include "no-car days", for example, and hours regarded as suitable for a fuel-saving driving operation may be anytime, such as midnight, other than rush hours. If the time and date information indicates a "no-car day", the traffic is light. Accordingly, the road on which the vehicle 300 is traveling can be determined to be suitable for a fuel-saving driving operation. If the time and date information indicates hours other than morning rush: hours (8:00 am to 10:00 am, for example), the traffic is light. Accordingly, the road on which the vehicle 300 is traveling can be determined to be suitable for a fuel-saving driving operation. If the time and date information indicates midnight, the traffic is light. Accordingly, the road on which the vehicle 300 is traveling can be determined to be suitable for a fuel-saving driving operation.

To determine whether the road on which the vehicle 300 is traveling is suitable for a fuel-saving driving operation, information about the distance from the vehicle running in front of the vehicle 300 may also be used. For example, if the distance from the vehicle running in front of the vehicle 300 is 20 meters or more, the road on which the vehicle 300 is traveling can be determined to be suitable for a fuel-saving driving operation.

If the vehicle 300 has a cruise control function, information about whether the cruise control is being performed may also be used to determine whether the road on which the vehicle 300 is traveling is suitable for a fuel-saving driving operation. If the cruise control is being performed, for example, the road on which the vehicle 300 is traveling can be determined to be suitable for a fuel-saving driving operation.

The vehicle 300 may further include a selecting unit for the driver to select a desired one of the predetermined conditions for providing the eco-drive support information. For example, the vehicle 300 has a terminal (not shown) functioning as the selecting unit in the vicinity of the driver's seat. The terminal is connected to the ECU 170. The notification determining unit 250 of the ECU 170 receives information from the terminal. The predetermined conditions for providing the eco-drive support information (the road category information indicating an expressway, the lane information indicating a cruise lane, or the like) are displayed on the terminal. The driver selects a desired one of the eco-drive support information providing conditions displayed on the terminal. If the notification determining unit 250 determines that the notification switch 160 has not been switched on, the notification determining unit 250 determines whether the driver is to be notified of an operation result, based on the eco-drive support information providing condition selected by the driver. Accordingly, even when the notification switch 160 is not on, the ECU 170 can notify the driver of the operation result of the operating unit 220 when the eco-drive support information providing condition selected by the driver is satisfied.

The vehicle 300 may further include a notification terminating unit that allows the driver to forcibly terminate notification of an operation result, if the notification of the operation result is sent even though the notification switch 160 is not on. For example, the vehicle 300 has a reset switch (not shown) functioning as the notification terminating unit in the vicinity of the driver's seat. The reset switch is connected to the ECU 170. The notification determining unit 250 of the ECU 170 determines whether the reset switch has been pressed. If the notification determining unit 250 determines that the reset switch has been pressed by the driver, the notification control unit 260 controls the notifying unit 270 to display the content (such as the travel distance) displayed before the eco-navigation is displayed. In this manner, the notification of the operation result to the driver is terminated.

If the notification determining unit 250 determines that the reset switch has been pressed, the notification determining unit 250 may thereafter determine that the driver is to be notified of the operation result only when the notification switch 160 is switched on. For example, if the reset switch is pressed by the driver after the notification determining unit 250 determines that the driver is to be notified of the operation result because the road on which the vehicle 300 is traveling is suitable for a fuel-saving driving operation though the notification switch 160 is not on, the notification determining unit 250 may thereafter determine that the driver is to be notified of the operation result of the operating unit 220 only when the notification switch 160 is switched on.

If the notification determining unit 250 determines that the reset switch has been pressed, the notification determining unit 250 may thereafter not use the determination criterion used before the reset switch is pressed. For example, if the reset switch is pressed by the driver after the notification determining unit 250 determines that the driver is to be notified of the operation result because the road category information used as a criterion indicates that the road is an expressway though the notification switch 160 is not on, the notification determining unit 250 may thereafter not use the road category information indicating an expressway as the determination criterion.

(First Variation)

As a condition for providing the eco-drive support information, the variation of the driving operation of the vehicle 300 may be used. More specifically, if the notification switch 160 is off, the notification determining unit 250 may determine whether the amount of change in the driving operation of the vehicle 300 by the driver has stayed within a predetermined range over a predetermined period of time. In a case where the amount of change in the driving operation of the vehicle 300 by the driver has stayed within the predetermined range over the predetermined period of time, a fuel-saving driving operation can be performed. If a fuel-saving driving operation can be performed, it is considered preferable to perform a fuel-saving driving operation so as to improve eco-friendliness in the motorized society. In other words, in a case where the amount of change in the driving operation of the vehicle 300 by the driver has stayed within the predetermined range over the predetermined period of time, the operation result of the operating unit 220 is likely to exhibit high eco-consciousness.

Figure 9:
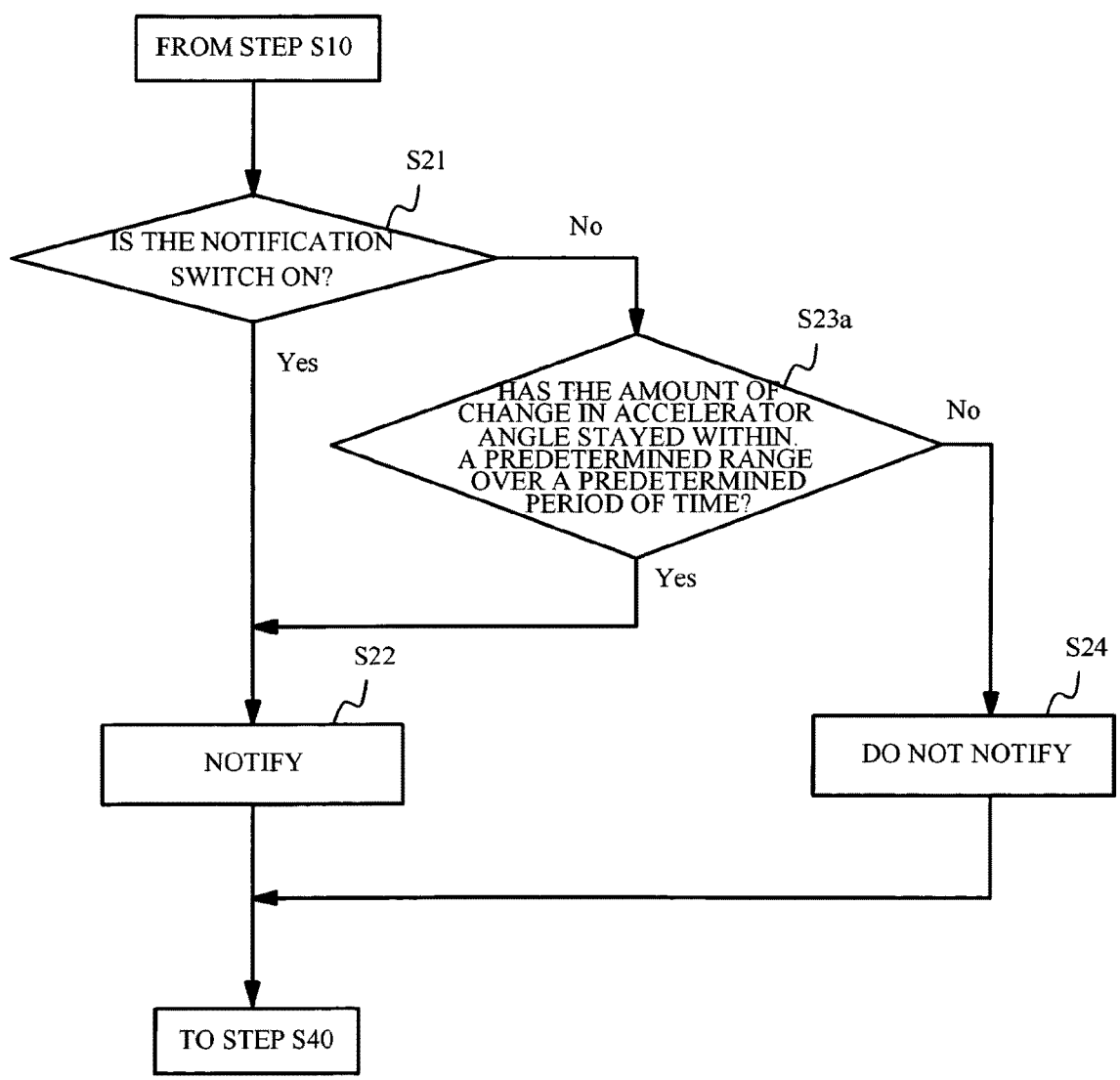
FIG. 9 is a flowchart for explaining the procedure (step S20) to be carried out by the notification determining unit of an ECU to determine whether the driver is to be notified of an operation result of the operating unit in accordance with a first variation of the first embodiment.

FIG. 9 is a flowchart showing the procedure (step S20) to be carried out by the notification determining unit 250 of the ECU 170 to determine whether the driver is to be notified of the operation result of the operating unit 220 in accordance with a first variation of this embodiment. The flowchart shown in FIG. 9 differs from the flowchart shown in FIG. 5, in that step S23 is replaced with step S23a. The other aspects are the same as those of the flowchart shown in FIG. 5, and therefore, explanation of them is omitted here.

In step S23a of FIG. 9, the notification determining unit 250 determines whether the amount of change in the driving operation of the vehicle 300 by the driver has stayed within the predetermined range over the predetermined period of time.

For example, the notification determining unit receives accelerator angle information from the automatic determination information input unit 240. The notification determining unit 250 then determines whether the amount of change in the accelerator angle has stayed within a predetermined range over a predetermined period of time. If the notification determining unit 250 determines that the amount of change in the accelerator angle has stayed within the predetermined range over the predetermined period of time, the notification determining unit 250 next carries out the procedure of step S22. If the notification determining unit 250 determines that the amount of change in the accelerator angle has not stayed within the predetermined range over the predetermined period of time, the notification determining unit 250 next carries out the procedure of step S24.

In the ECU 170 in accordance with the first variation, when the notification switch 160 is off, the notification determining unit 250 determines whether the driver is to be notified of the operation result of the operating unit 220, based on whether the amount of change in the driving operation of the vehicle 300 by the driver has stayed within the predetermined range over the predetermined period of time. In this manner, even when the notification switch 160 is off, the driver can be notified of the operation result of the operating unit 220 in a case where the amount of change in the driving operation of the vehicle 300 by the driver has stayed within the predetermined range over the predetermined period of time. As a result, even a driver who is not aware that the eco-drive support device is mounted on the vehicle 300 or a driver who is not interested in improving eco-consciousness in the motorized society can be notified of the eco-drive support information. Thus, the eco-consciousness in the motorized society can be improved.

In step S23a of FIG. 9, the amount of change in the driving operation of the vehicle 300 may be the amount of change in vehicle speed, the amount of change in the transmission gear ratio of the transmission 20, the amount of change in the number of revolutions of the internal-combustion engine 10, the amount of change in the output torque of the internal-combustion engine 10, the amount of change in the power generated from the internal-combustion engine 10, or the like, instead of the amount of change in the accelerator angle. If the internal-combustion engine 10 is a hybrid engine, the amount of change in the number of motor revolutions of the electric motor of the hybrid engine may be used as the amount of change in the driving operation of the vehicle 300.

The threshold values of the conditions (the accelerator angle range, the period of time in which the accelerator angle is within the range, and the likes in step S23a of FIG. 9, for example) on which the determining operations to be performed by the notification determining unit 250 are based may be changed in accordance with the frequency of switching on and off of the notification switch 160 (the ratio between the period of time in which the ignition switch (not shown) of the vehicle 300 is on and the period of time in which the notification switch 160 is on, for example). If the ratio of the period of time in which the notification switch 160 is on is high, the driver is considered to have high consciousness about eco-drive. Accordingly, when the notification switch 160 is off, the necessity to notify the driver is considered to be low. Therefore, if the ratio of the period of time in which the notification switch 160 is on is high, the conditions to be used in a determining operation in step S23*a* may be made stricter. If the ratio of the period of time in which the notification switch 160 is on is low, the driver's consciousness about eco-drive might be lowered by further narrowing the conditions to be used in a determining operation in step S23*a*. Therefore, if the ratio of the period of time in which the notification switch 160 is on is low, the conditions to be used in step S23*a* may be made less strict.

(Second Variation)

To determine whether to provide the eco-drive support information, the remaining energy of the vehicle 300 may be used. More specifically, when the remaining energy amount in the vehicle 300 is equal to or smaller than a predetermined value, notification of the eco-drive support information may be performed. In this case, when the notification switch 160 is off, the notification determining unit 250 determines whether the remaining energy amount in the vehicle 300 is equal to or less than the predetermined value. The remaining energy amount may be the remaining battery level. If the remaining battery level in the vehicle 300 is equal to or smaller than a predetermined value, it is considered preferable to perform a fuel-saving driving operation, so as to prevent the vehicle 300 from stalling.

Figure 10:
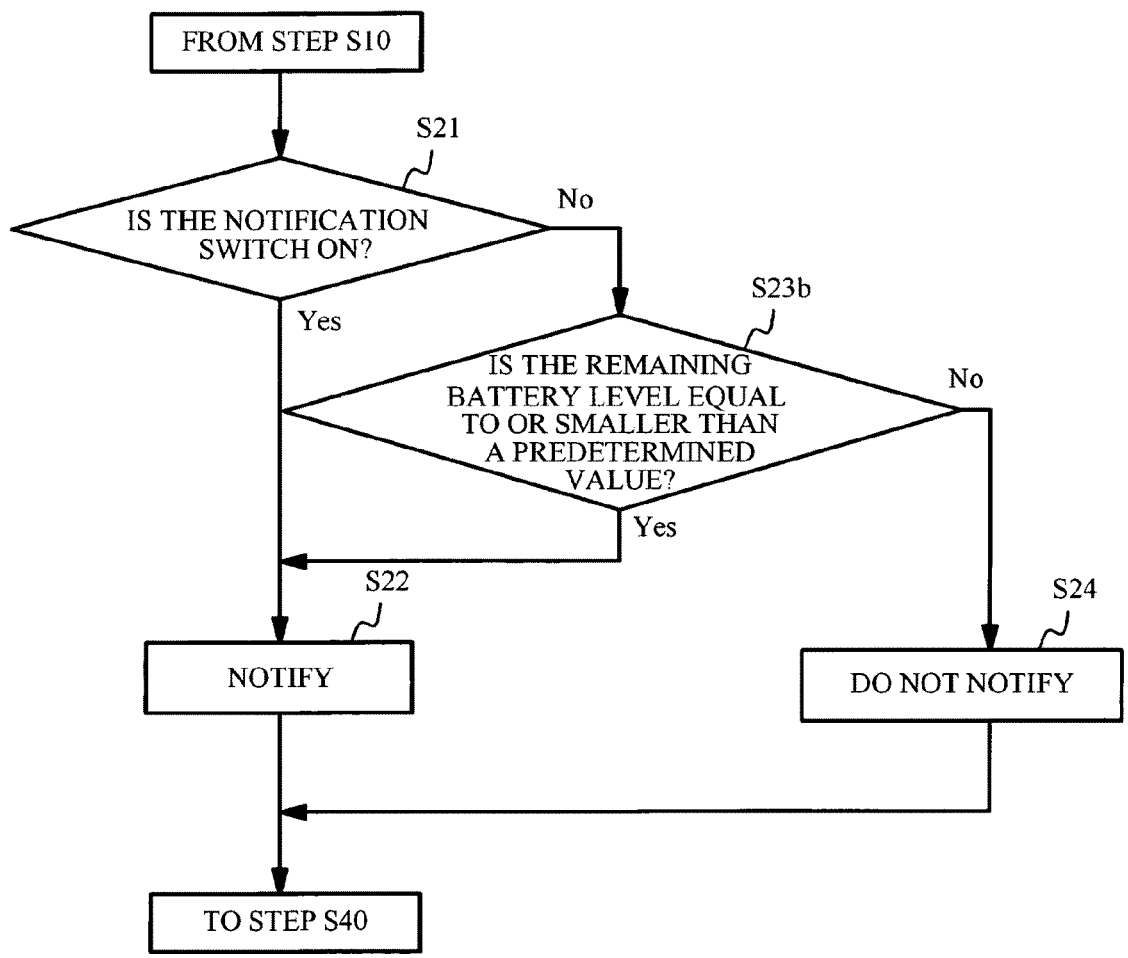
FIG. 10 is a flowchart for explaining the procedure (step S20) to be carried out by the notification determining unit of an ECU to determine whether the driver is to be notified of an operation result of the operating unit in accordance with a second variation of the first embodiment.

FIG. 10 is a flowchart showing the procedure (step S20) to be carried out by the notification determining unit 250 of the ECU 170 to determine whether the driver is to be notified of the operation result of the operating unit 220 in accordance with a second variation of this embodiment. The flowchart shown in FIG. 10 differs from the flowchart of FIG. 5, in that step S23 is replaced with step S23*b*. The other aspects are the same as those in the flowchart of FIG. 5, and therefore, explanation of them is omitted here.

In step S23*b* of FIG. 10, the notification determining unit 250 determines whether the remaining battery level is equal to or less than the predetermined value. For example, the notification determining unit 250 receives remaining battery information from the automatic determination information input unit 240, and then determines whether the remaining battery level is equal to or less than the predetermined value.

If the notification determining unit 250 determines that the remaining battery level is equal to or less than the predetermined value in step S23*b*, the notification determining unit 250 next carries out the procedure of step S22. If the notification determining unit 250 determines the remaining battery level not to be equal to or smaller than the predetermined value in step S23*b*, the notification determining unit 250 next carries out the procedure of step S24.

In the ECU 170 in accordance with the second variation, when the notification switch 160 is off, the notification determining unit 250 determines whether the driver is to be notified of the operation result of the operating unit 220, based on whether the remaining battery level in the vehicle 300 is equal to or smaller than the predetermined value. In this manner, even when the notification switch 160 is off, the driver can be notified of the operation result of the operating unit 220, if the remaining battery level in the vehicle 300 is equal to or smaller than the predetermined value. As a result, even a driver who is not aware that the eco-drive support device is mounted on the vehicle 300 or a driver who is not interested in improving eco-consciousness in the motorized society can be notified of the eco-drive support information. Thus, the eco-consciousness in the motorized society can be improved. Also, the vehicle 300 can be prevented from stalling.

(Third Variation)

Figure 11:
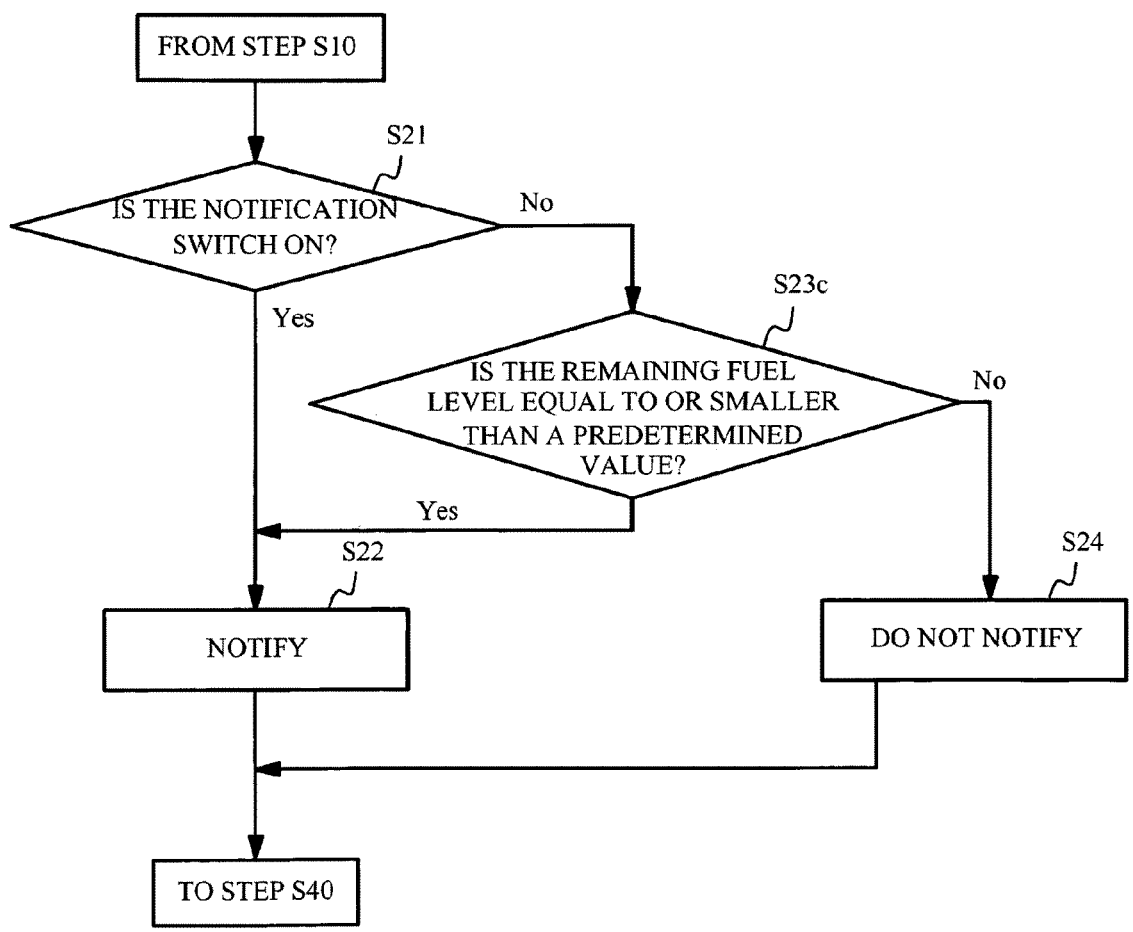
FIG. 11 is a flowchart for explaining the procedure (step S20) to be carried out by the notification determining unit of an ECU to determine whether the driver is to be notified of an operation result of the operating unit in accordance with a third variation of the first embodiment.

The remaining energy may be the remaining fuel level. FIG. 11 is a flowchart showing the procedure (step S20) to be carried out by the notification determining unit 250 of the ECU 170 to determine whether the driver is to be notified of the operation result of the operating unit 220 in accordance with a third variation of this embodiment. The flowchart shown in FIG. 11 differs from the flowchart of FIG. 5, in that step S23 is replaced with step S23*c*. The other aspects are the same as those in the flowchart of FIG. 5, and therefore, explanation of them is omitted here.

In step S23*c* of FIG. 11, the notification determining unit 250 determines whether the remaining fuel level is equal to or less than a predetermined value. For example, the notification determining unit 250 receives remaining fuel information from the automatic determination information input unit 240, and then determines whether the remaining fuel level is equal to or less than the predetermined value.

If the notification determining unit 250 determines that the remaining fuel level is equal to or less than the predetermined value in step S23*c*, the notification determining unit 250 next carries out the procedure of step S22. If the notification determining unit 250 determines the remaining fuel level not to be equal to or smaller than the predetermined value in step S23*c*, the notification determining unit 250 next carries out the procedure of step S24.

In the ECU 170 in accordance with the third variation, when the notification switch 160 is off, the notification determining unit 250 determines whether the driver is to be notified of the operation result of the operating unit 220, based on whether the remaining fuel level in the vehicle 300 is equal to or smaller than the predetermined value. In this manner, even when the notification switch 160 is off, the driver can be notified of the operation result of the operating unit 220, if the remaining fuel level in the vehicle 300 is equal to or smaller than the predetermined value. As a result, even a driver who is not aware that the eco-drive support device is mounted on the vehicle 300 or a driver who is not interested in improving eco-consciousness in the motorized society can be notified of the eco-drive support information. Thus, the eco-consciousness in the motorized society can be improved. Also, the vehicle 300 can be prevented from stalling.

(Fourth Variation)

To determine whether to provide the eco-drive support information, a fuel-saving drive request from outside the vehicle 300 may be used. In this case, when the notification switch 160 is off, the notification determining unit 250 determines whether there is a fuel-saving drive request from outside the vehicle 300. A fuel-saving drive request is equivalent to a request for a highly eco-conscious driving operation.

Figure 12:
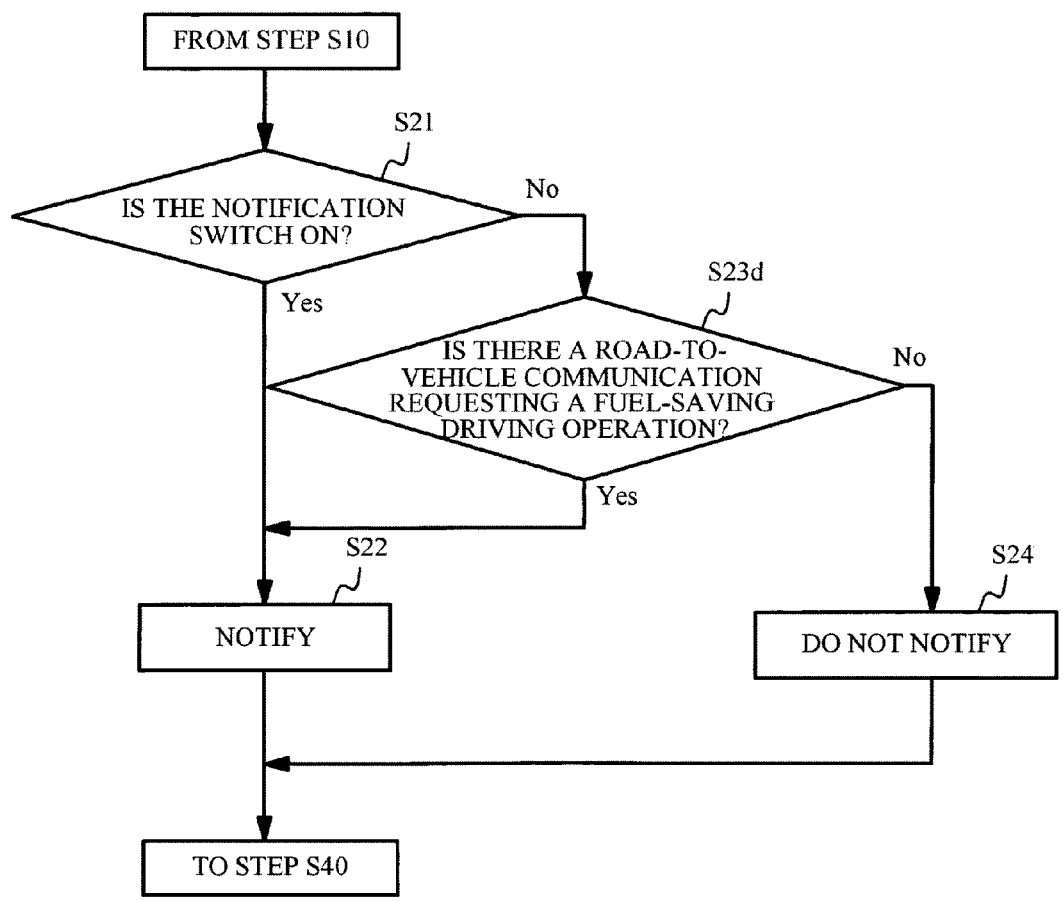
FIG. 12 is a flowchart for explaining the procedure (step S20) to be carried out by the notification determining unit of an ECU to determine whether the driver is to be notified of an operation result of the operating unit in accordance with a fourth variation of the first embodiment.

FIG. 12 is a flowchart showing the procedure (step S20) to be carried out by the notification determining unit 250 of the ECU 170 to determine whether the driver is to be notified of the operation result of the operating unit 220 in accordance with a fourth variation of this embodiment. The flowchart shown in FIG. 12 differs from the flowchart shown in FIG. 5, in that step S23 is replaced with step S23*d*. The other aspects are the same as those in the flowchart of FIG. 5, and therefore, explanation of them is omitted here.

In step S23*d* of FIG. 12, the notification determining unit 250 determines whether there is a fuel-saving drive request from outside the vehicle 300, based on the information from the automatic determination information input unit 240. For example, the notification determining unit 250 receives a road-to-vehicle communication transmitted from a wireless transmission device provided on the route through the automatic determination information input unit 240. If there is a road-to-vehicle communication requesting a fuel-saving driving operation, the notification determining unit 250 determines that there is a fuel-saving drive request from outside the vehicle 300.

If the notification determining unit 250 determines that there is a road-to-vehicle communication requesting a fuel-saving driving operation in step S23d, the notification determining unit 250 next carries out the procedure of step S22. If the notification determining unit 250 determines that there is not a road-to-vehicle communication requesting a fuel-saving driving operation in step S23d, the notification determining unit 250 next carries out the procedure of step S24.

In the ECU 170 in accordance with the fourth variation, when the notification switch 160 is off, the notification determining unit 250 determines whether the driver is to be notified of the operation result of the operating unit 220, based on whether there is a fuel-saving drive request from outside the vehicle. In this manner, even when the notification switch 160 is off, the driver can be notified of the operation result of the operating unit 220, if there is a fuel-saving drive request from outside the vehicle. As a result, even a driver who is not aware that the eco-drive support device is mounted on the vehicle 300 or a driver who is not interested in improving eco-consciousness in the motorized society can be notified of the eco-drive support information. Thus, the eco-consciousness in the motorized society can be improved.

(Fifth Variation)

To determine whether to provide the eco-drive support information, the notification determining unit 250 may determine whether the period in which there has not been a request for eco-drive support information notification from the input unit or the period in which the notification switch 160 has been off is equal to or longer than a predetermined period. In this case, when the notification switch 160 is off, the notification determining unit 250 determines whether the driver is to be notified of an operation result, based on whether the period in which the notification switch 160 has been off is equal to or longer than the predetermined period. If the period in which the notification switch 160 has been off is equal to or longer than the predetermined period, there is a high possibility that the driver is not aware that the eco-drive support device is mounted on the vehicle 300. Therefore, even when the notification switch 160 is off, it is considered preferable to notify such a driver of an operation result, so as to improve the eco-consciousness in the motorized society. Also, if the period in which the notification switch 160 has been off is equal to or longer than the predetermined period, there is a high possibility that the driver is purposely not performing a fuel-saving driving operation. Therefore, even when the notification switch 160 is off, it is considered preferable to notify such a driver of an operation result, so as to improve the eco-consciousness in the motorized society.

Figure 13:
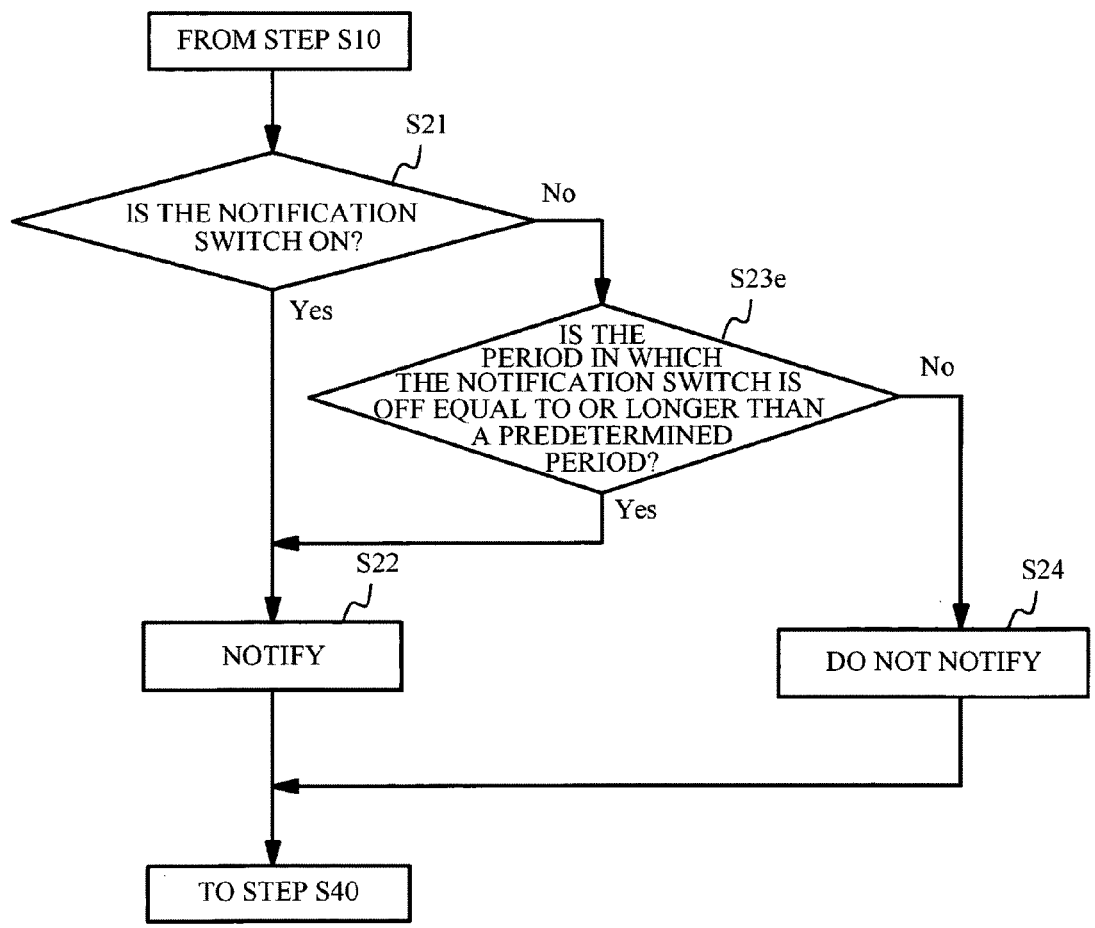
FIG. 13 is a flowchart for explaining the procedure (step S20) to be carried out by the notification determining unit of an ECU to determine whether the driver is to be notified of an operation result of the operating unit in accordance with a fifth variation of the first embodiment.

FIG. 13 is a flowchart showing the procedure (step S20) to be carried out by the notification determining unit 250 of the ECU 170 to determine whether the driver is to be notified of the operation result of the operating unit 220 in accordance with a fifth variation of this embodiment. The flowchart shown in FIG. 13 differs from the flowchart shown in FIG. 5, in that step S23 is replaced with step S23e. The other aspects are the same as those in the flowchart of FIG. 5, and therefore, explanation of them is omitted here.

In step S23e of FIG. 13, the notification determining unit 250 determines whether the period in which the notification switch 160 has been off is equal to or longer than the predetermined period. For example, the notification determining unit 250 receives information about whether the notification switch 160 is on or off from the notification request information input unit 230. The notification determining unit 250 then determines whether the period in which the notification switch 160 has been off is equal to or longer than the predetermined period. The predetermined period may be a predetermined period of time.

If the notification determining unit 250 determines that the period in which the notification switch 160 has been off is equal to or longer than the predetermined period in step S23e, the notification determining unit 250 next carries out the procedure of step S22. If the notification determining unit 250 determines that the period in which the notification switch 160 has been off is not equal to or longer than the predetermined period in step S23e, the notification determining unit 250 next carries out the procedure of step S24.

In the ECU 170 in accordance with the fifth variation, when the notification switch 160 is off, the notification determining unit 250 determines whether the driver is to be notified of the operation result of the operating unit 220, based on whether the period in which the notification switch 160 has been off is equal to or longer than the predetermined period. In this manner, even when the notification switch 160 is off, the driver can be notified of the operation result of the operating unit 220, if the period in which the notification switch 160 has been off is equal to or longer than the predetermined period. As a result, even a driver who is not aware that the eco-drive support device is mounted on the vehicle 300 or a driver who is not interested in improving eco-consciousness in the motorized society can be notified of the eco-drive support information. Thus, the eco-consciousness in the motorized society can be improved.

In this embodiment, the period in which the notification switch 160 has been off may not be represented by time. For example, the period in which the notification switch 160 has been off may be represented by the travel distance. More specifically, in step S23e, the notification determining unit 250 may determine whether the distance the vehicle 300 has traveled while the notification switch 160 has been off is equal to or longer than a predetermined distance.

(Sixth Variation)

Figure 14:
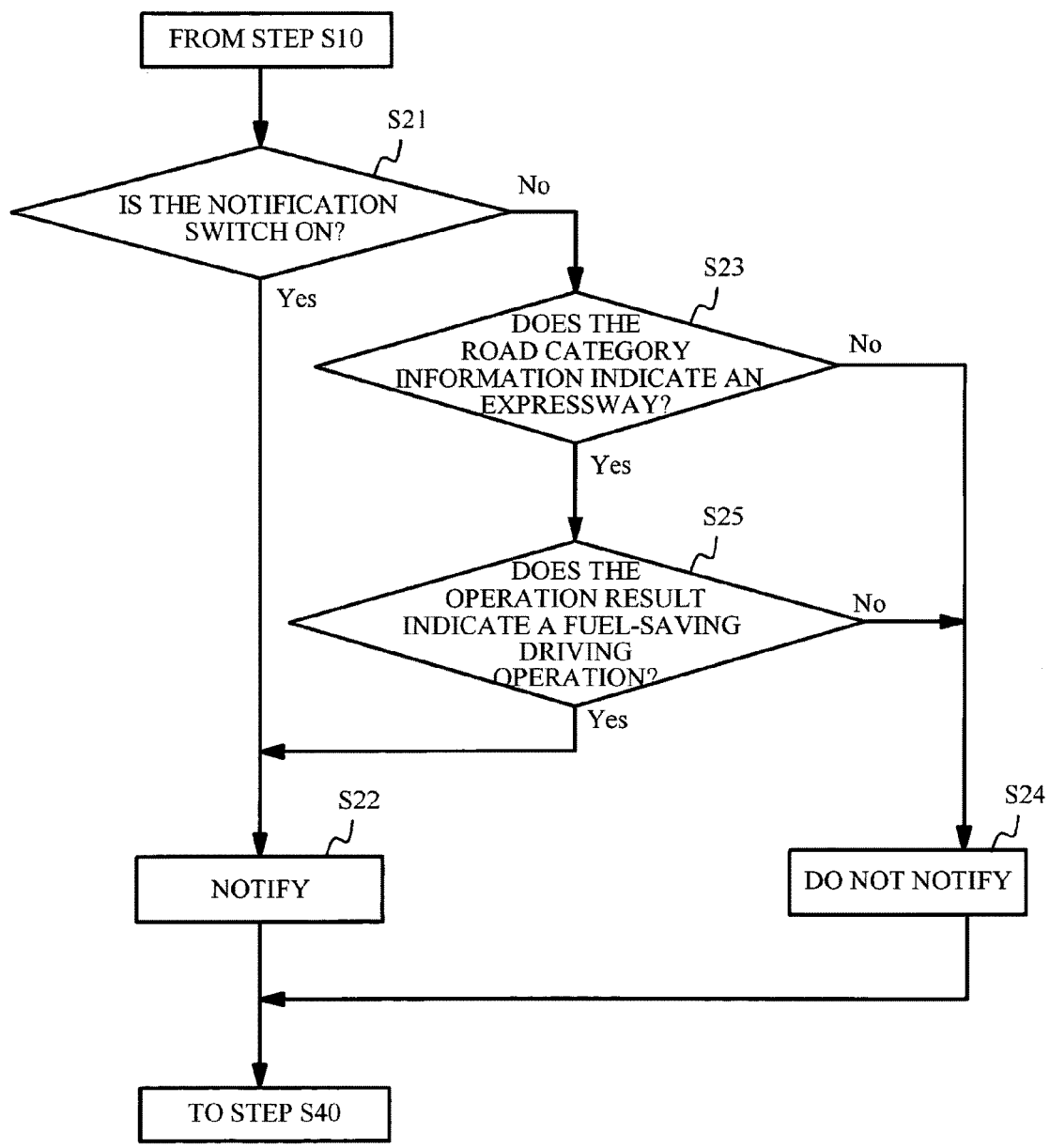
FIG. 14 is a flowchart for explaining the procedure (step S20) to be carried out by the notification determining unit of an ECU to determine whether the driver is to be notified of an operation result of the operating unit in accordance with a sixth variation of the first embodiment.

When the notification switch 160 is off, the notification determining unit 250 may determine that the driver is to be notified of an operation result, if the conditions for providing the eco-drive support information are satisfied, and the operation result of the operating unit 220 indicates a fuel-saving driving operation. FIG. 14 is a flowchart showing the procedure (step S20) to be carried out by the notification determining unit 250 of the ECU 170 to determine whether the driver is to be notified of the operation result of the operating unit 220 in accordance with a sixth variation of this embodiment. The flowchart shown in FIG. 14 differs from the flowchart shown in FIG. 5, in further including step S25. In the ECU 170 in accordance with the sixth variation, the notification determining unit 250 receives the operation results of the notification request information input unit 230, the automatic determination information input unit 240, and the operating unit 220.

As shown in FIG. 14, the notification determining unit 250 first determines whether the notification switch 160 has been turned on (step S21). If the notification determining unit 250 determines that the notification switch 160 has been switched on in step S21, the notification determining unit 250 determines that the driver is to be notified of the operation results (step S22). The notification determining unit 250 next carries out the procedure of step S40.

If the notification determining unit 250 determines that the notification switch 160 has not been switched on in step S21, the notification determining unit 250 determines whether the conditions for providing the eco-drive support information are satisfied (step S23). For example, based on the information from the automatic determination information input unit 240, the notification determining unit 250 determines whether the road category information indicates that the road is an expressway.

If the notification determining unit 250 determines that the road category information indicates that the road is an expressway in step S23, the notification determining unit 250 next determines whether the operation result of the operation unit 220 indicates a fuel-saving driving operation (step S25). If the notification determining unit 250 determines that the operation result of the operating unit 220 indicates a fuel-saving driving operation in step S25, the notification determining unit 250 determines that the driver is to be notified of the operation result (step S22). The notification determining unit 250 then carries out the procedure of step S40.

If the notification determining unit 250 determines that the road category information does not indicate an expressway in step S23, the notification determining unit 250 determines that the driver is not to be notified of the operation result (step S24). The notification determining unit 250 then carries out the procedure of step S40. If the notification determining unit 250 determines that the operation result of the operating unit 220 indicates a fuel-saving driving operation in step S25, the notification determining unit 250 determines that the driver is not to be notified of the operation result (step S24). The notification determining unit 250 then carries out the procedure of step S40.

In the ECU 170 in accordance with the sixth variation, when the notification switch 160 is off, the notification determining unit 250 determines whether the driver is to be notified of the operation result of the operating unit 220, based on the two criteria: whether the conditions for providing the eco-drive support information are satisfied, and whether the operation result of the operating unit 220 indicates a fuel-saving driving operation. In this manner, even when the notification switch 160 is off, the driver can be notified of the operation result of the operating unit 220, if the conditions for providing the eco-drive support information are satisfied, and the operation result of the operating unit 220 indicates a fuel-saving driving operation. As a result, even a driver who is not aware that the eco-drive support device is mounted on the vehicle 300 or a driver who is not interested in improving eco-consciousness in the motorized society can be notified of the eco-drive support information. Thus, the eco-consciousness in the motorized society can be improved.

(Seventh Variation)

Figure 15:
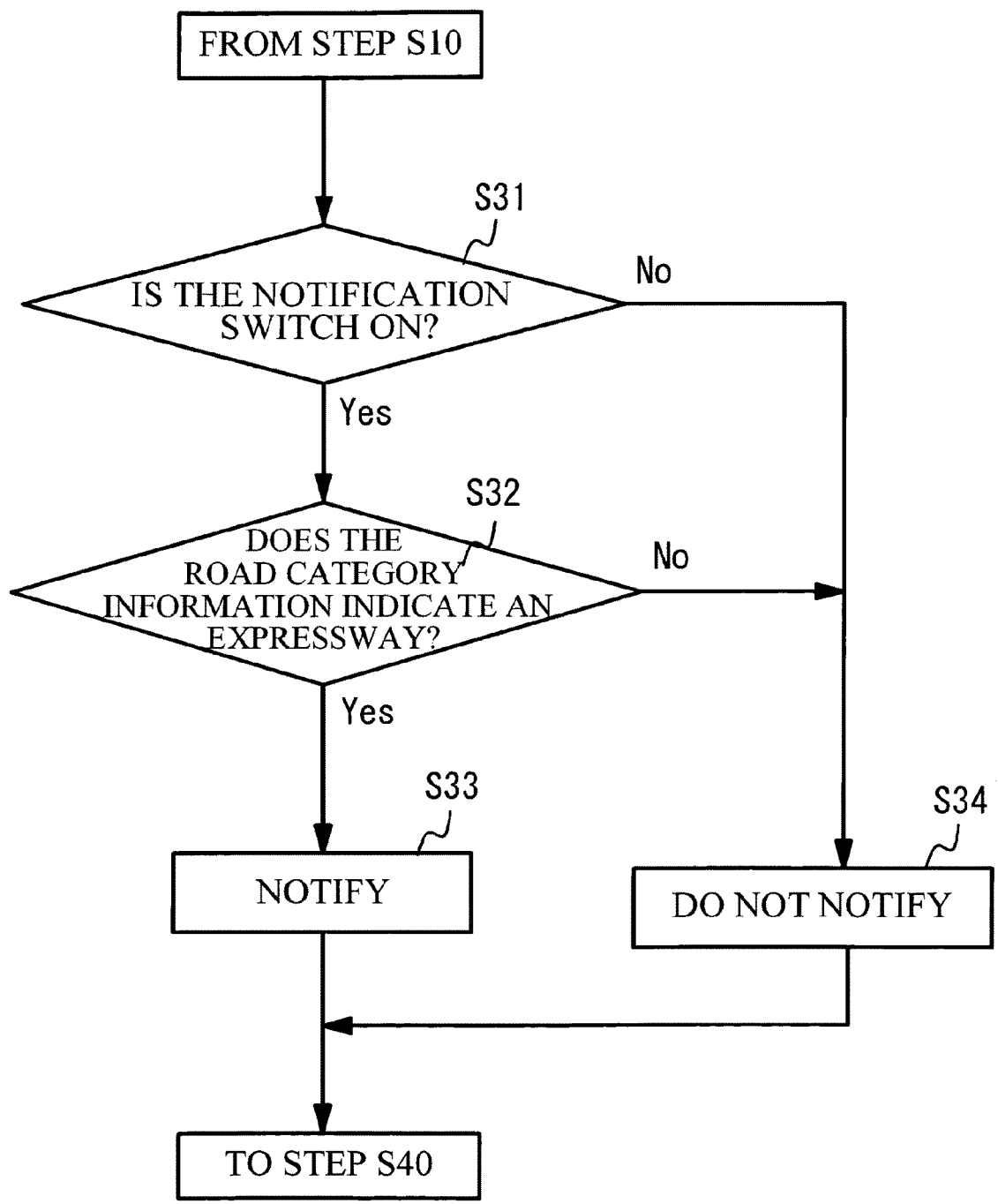
FIG. 15 is a flowchart for explaining the procedure (step S20) to be carried out by the notification determining unit of an ECU to determine whether the driver is to be notified of another operation result of the operating unit after the notifying unit notifies of the driver of an operation result of the operating unit in accordance with a seventh variation of the first embodiment.

If the notification switch 160 is on after the notifying unit 270 notifies the driver of the operation result of the operating unit 220, the notification determining unit 250 may further determine whether to notify an operation result, based on whether the conditions for providing the eco-drive support information are satisfied. FIG. 15 is a flowchart showing the procedure (step S20) to be carried out by the notification determining unit 250 of the ECU 170 to determine whether the driver is to be further notified of the operation result of the operating unit 220 after the notifying unit 270 notifies the driver of the operation result of the operating unit 220 in accordance with a seventh variation of this embodiment.

Before the notifying unit 270 notifies the driver of the operation result of the operating unit 220, the notification determining unit 250 of the ECU 170 in accordance with the seventh variation performs the operation illustrated in the flowchart shown in FIG. 5. After the notifying unit 270 notifies the driver of the operation result of the operating unit 220, the notification determining unit 250 performs the operation illustrated in the flowchart shown in FIG. 15, instead of the operation illustrated in the flowchart shown in FIG. 5.

As shown in FIG. 15, after the notifying unit 270 notifies the driver of the operation result of the operating unit 220, the notification determining unit 250 determines whether the notification switch 160 is on (step S31).

If the notification determining unit 250 determines that the notification switch 160 is on in step S31, the notification determining unit 250 next determines whether the conditions for providing the eco-drive support information are satisfied (step S32). For example, the notification determining unit 250 determines whether the road on which the vehicle 300 is traveling is suitable for a fuel-saving driving operation. More specifically, the notification determining unit 250 determines whether the road category information indicates that the road is an expressway.

If the notification determining unit 250 determines that the road category information indicates an expressway in step S32, the notification determining unit 250 determines that the driver is to be notified of the operation result (step S33). The notification determining unit 250 then carries out the procedure of step S40.

If the notification determining unit 250 determines that the notification switch 260 is not on in step S31, the notification determining unit 250 determines that the driver is not to be notified of the operation result (step S34). The notification determining unit 250 then carries out the procedure of step S40. If the notification determining unit 250 determines that the road category information does not indicate an expressway in step S32, the notification determining unit 250 then carries out the procedure of step S34.

The ECU 170 in accordance with the seventh variation also includes the notification determining unit 250. Accordingly, even when the notification switch 160 is off, the driver can be notified of the operation result of the operating unit 220, if the conditions for providing the eco-drive support information are satisfied. As a result, even a driver who is not aware that the eco-drive support device is mounted on the vehicle 300 or a driver who is not interested in improving eco-consciousness in the motorized society can be notified of the eco-drive support information. Thus, the eco-consciousness in the motorized society can be improved.

Also, even in a case where the notification switch 160 is on after the notifying unit 270 notifies the driver of the operation result in the ECU 170 in accordance with the seventh variation, the notification of the eco-drive support information can be ended, if the conditions for providing the eco-drive support information are not satisfied (step S32). Accordingly, when traveling on a road with low eco-friendliness (such as a road not suited for a fuel-saving driving operation), the driver can be prevented from performing a highly eco-conscious driving operation (such as a fuel-saving driving operation).

Instead of step S32 shown in FIG. 15, the notification determining unit 250 may carry out step S23a shown in FIG. 9, step S23b shown in FIG. 10, step S23c shown in FIG. 11, step S23d shown in FIG. 12, step S23e shown in FIG. 13, or steps S23 and S25 shown in FIG. 14.

In a case where the notification determining unit 250 determines that the driver is not to be notified of the operation result when the notification switch 160 is on, the notification control unit 260 may control the notifying unit 270 so that the driver is further informed that the notification of the operation result has been ended. Also, in a case where the notification determining unit 250 determines that the driver is not to be notified of the operation result when the notification switch 160 is on, the notification control unit 260 may control the notifying unit 270 so that the driver is further informed of the reason that the operation result notification has been ended.

Figure 16:
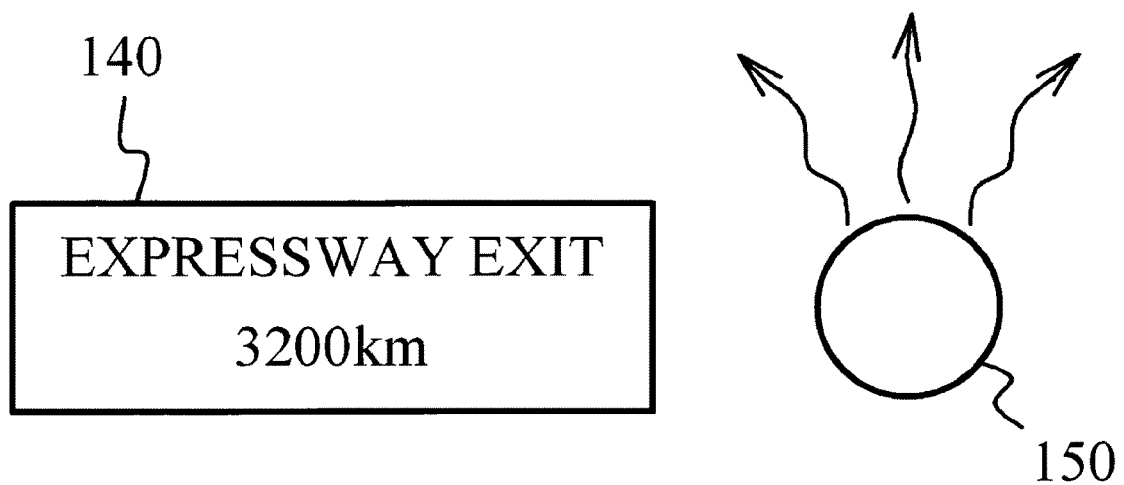
FIG. 16 is a schematic view showing an example of notification by the notifying unit in accordance with the seventh variation of the first embodiment.

FIG. 16 is a schematic view showing an example of notification made by the notifying unit 270 in accordance with the seventh variation of the first embodiment. More specifically, FIG. 16 is a schematic view showing an example of notification made by the notifying unit 270 in a case where the notification of the operation result is ended though the notification switch 160 is on after the notifying unit 270 notifies the driver of the operation result of the operating unit 220. As shown in FIG. 16, if the operation result notification is ended though the notification switch 160 is on after the notifying unit 270 notifies the driver of the operation result of the operating unit 220, the display content (the travel distance) displayed before the eco-navigation is displayed is brought back on the lower half of the display 140 of the notifying unit 270, and "expressway exit" is displayed on the upper half. Accordingly, the driver can be informed of the reason that the operation result notification has been ended though the driver switched on the notification switch 160. Also, a voice message announcing that "the eco-navigation display has ended" is emitted from the speaker 150 of the notifying unit 270. Accordingly, the driver can be informed that the operation result notification has been ended though the driver switched on the notification switch 160.

(Eighth Variation)

Figure 17:
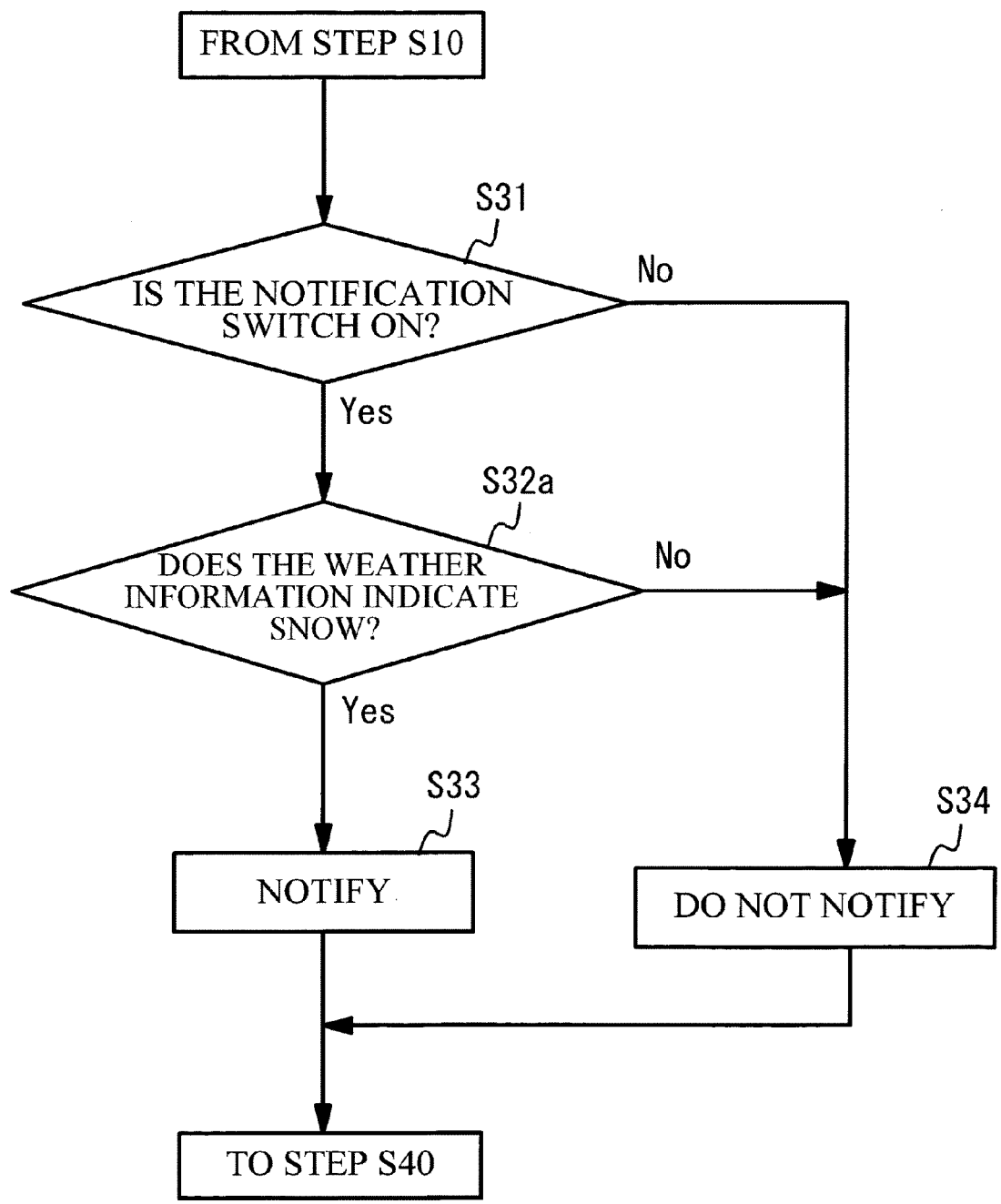
FIG. 17 is a flowchart for explaining the procedure (step S20) to be carried out by the notification determining unit of an ECU to determine whether the driver is to be notified of another operation result of the operating unit after the notifying unit notifies of the driver of an operation result of the operating unit in accordance with an eighth variation of the first embodiment.

If the notification switch 160 is on after the notifying unit 270 notifies the driver of the operation result of the operating unit 220, the notification determining unit 250 may determine whether the driver is to be further notified of the operation result, based on whether there is a safety problem in further notifying the driver of the operation result of the operating unit 220. FIG. 17 is a flowchart showing the procedure (step S20) to be carried out by the notification determining unit 250 of the ECU 170 to determine whether the driver is to be further notified of the operation result of the operating unit 220 after the notifying unit 270 notifies the driver of the operation result of the operating unit 220 in accordance with an eighth variation of this embodiment.

Before the notifying unit 270 notifies the driver of the operation result of the operating unit 220, the notification determining unit 250 of the ECU 170 in accordance with the eighth variation performs the operation illustrated in the flowchart shown in FIG. 5. After the notifying unit 270 notifies the driver of the operation result of the operating unit 220, the notification determining unit 250 performs the operation illustrated in the flowchart shown in FIG. 17, instead of the operation illustrated in the flowchart shown in FIG. 5. The flowchart shown in FIG. 17 has step S32a in place of step S32 of the flowchart shown in FIG. 15. The other aspects of the flowchart shown in FIG. 17 are the same as those of the flowchart shown in FIG. 15, and therefore, explanation of them is omitted here.

In step S32a of FIG. 17, the notification determining unit 250 determines whether there is a safety problem in notifying the driver of the operation result of the operating unit 220. For example, the notification determining unit 250 obtains weather information from the automatic determination information input unit 240. The notification determining unit 250 determines whether the weather information indicates snow. If the notification determining unit 250 determines that the weather information indicates snow, the notification determining unit 250 determines that a safety problem is caused if the driver is notified of the operation result of the operating unit 220. When the weather information indicates snow, the driver must concentrate on driving. Therefore, if the eco-navigation display is performed where the weather information indicates snow, the driver's concentration on driving might be ruined, and a safety problem is raised. If the notification determining unit 250 determines that the weather information does not indicate snow, the notification determining unit 250 determines that a safety problem is not raised even if the driver is notified of the operation result of the operating unit 220.

If the notification determining unit 250 determines that there is not a safety problem in notifying the driver of the operation result of the operating unit 220 in step S32a, the notification determining unit 250 carries out the procedure of step S33. If the notification determining unit 250 determines that the weather information indicates snow, or that there is a safety problem in notifying the driver of the operation result of the operating unit 220, the notification determining unit 250 carries out the procedure of step S34.

The ECU 170 in accordance with the eighth variation also includes the notification determining unit 250. Accordingly, even when the notification switch 160 is off, the driver can be notified of the operation result of the operating unit 220, if the conditions for providing the eco-drive support information are satisfied. As a result, even a driver who is not aware that the eco-drive support device is mounted on the vehicle 300 or a driver who is not interested in improving eco-consciousness in the motorized society can be notified of the eco-drive support information. Thus, the eco-consciousness in the motorized society can be improved.

Also, even in a case where the notification switch 160 is on after the notifying unit 270 notifies the driver of the operation result in the ECU 170 in accordance with the eighth variation, the notification of the eco-drive support information can be ended, if a safety problem is raised by notifying the driver of the operation result. In this manner, safe driving can be maintained.

If the notification determining unit 250 determines that the driver is not to be notified of the operation result though the notification switch 160 is on, the notification control unit 260 may control the notifying unit 270 so that the driver is further informed that the operation result notification has been ended. Also, if the notification determining unit 250 determines that the driver is not to be notified of the operation result though the notification switch 160 is on, the notification control unit 260 may control the notifying unit 270 so that the driver is further informed of the reason that the operation result notification has been ended.

For example, if the notification determining unit 250 determines that the driver is not to be notified of the operation result because the weather information indicates snow though the notification switch 160 is on, the display content (the travel distance) displayed before the eco-navigation screen is displayed is brought back on the lower half of the display 140 of the notifying unit 270. At the same time, "snow" is displayed on the upper half of the display 140. Accordingly, the driver can be informed of the reason that the operation result notification has been ended though the driver switched on the notification switch 160. Also, a voice message announcing that "the eco-navigation display has ended" is emitted from the speaker 150 of the notifying unit 270. In this manner, the driver can be informed that the operation result notification has been ended though the driver switched on the notification switch 160.

In step S32a of FIG. 17, criteria other than the weather information may be used to determine whether a safety problem is caused by notifying the driver of the operation result. For example, the windshield wiper speed may be used to determine whether a safety problem is caused by notifying the driver of the operation result. In this case, the notification determining unit 250 receives windshield wiper speed information from the automatic determination information input unit 240. If the windshield wiper speed is at the maximum speed, the notification determining unit 250 determines that there is a safety problem in notifying the driver of the operation result.

In a case where the vehicle 300 has a safety control device such as an ABS (Antilock Braking System) or VDIM (Vehicle Dynamics Integrated Management), the notification determining unit 250 may determine whether the safety control device has been operated, so as to determine whether there is a safety problem in notifying the driver of the operation result. In this case, the notification determining unit 250 receives information about whether the safety control device has been operated from the ECU 170. In a case where the safety control device has been operated, the notification determining unit 250 determines that a safety problem is caused if the driver is notified of the operation result.

To determine whether a safety problem is caused by notifying the driver of the operation result, the external temperature of the vehicle 300 may be used. In this case, the notification determining unit 250 receives information about the external temperature of the vehicle 300 from the automatic determination information input unit 240. In a case where the external temperature of the vehicle 300 is equal to or lower than −1° C., for example, the notification determining unit 250 determines that a safety problem is caused if the driver is notified of the operation result.

(Ninth Variation)

Figure 18:
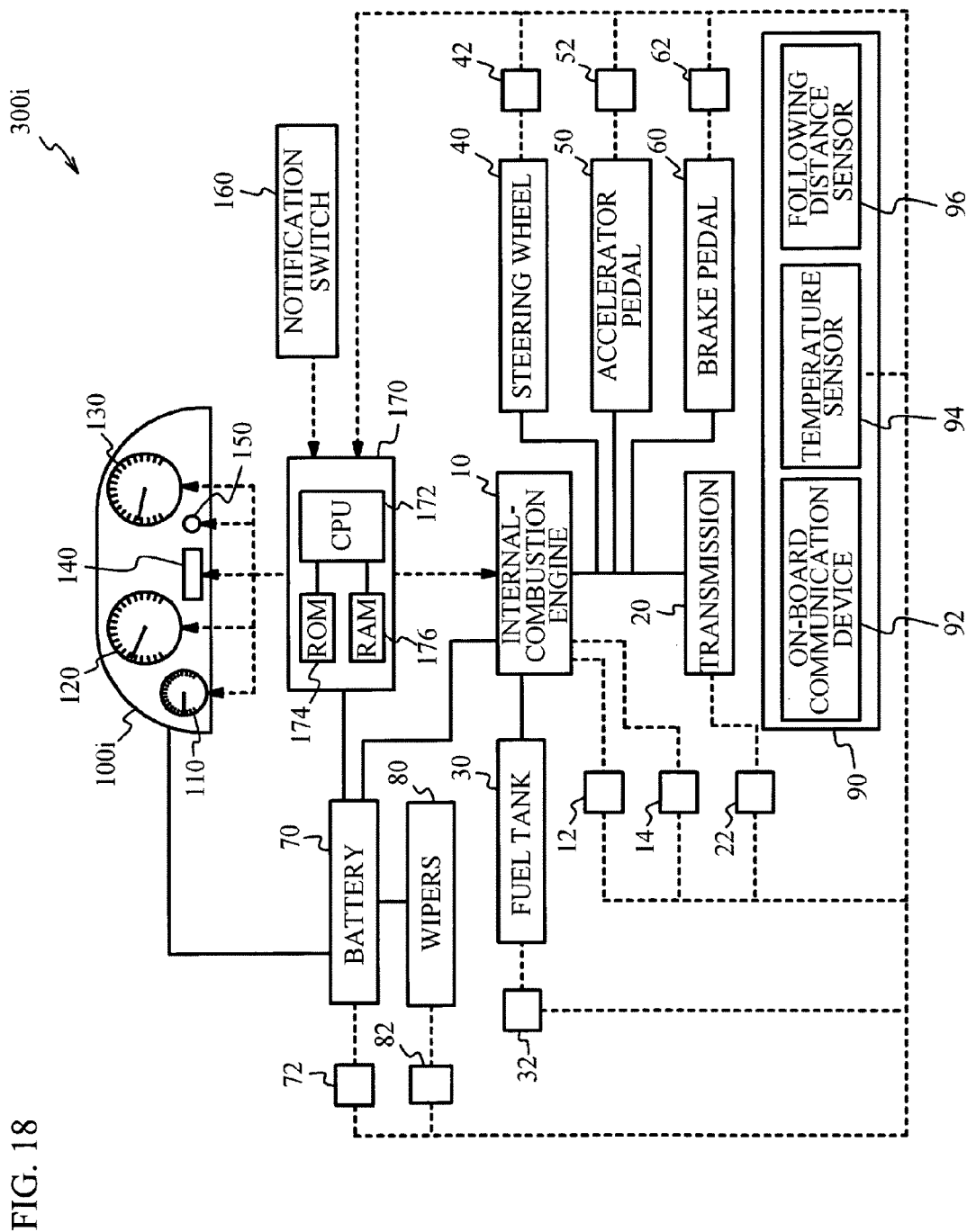
FIG. 18 is a block diagram schematically showing the entire structure of a vehicle into which an ECU in accordance with a ninth variation of the first embodiment is incorporated.

The notifying unit 270 of the vehicle 300 is not limited to the display 140 and the speaker 150, as long as it can notify the driver of the eco-drive support information. For example, the notifying unit 270 may have a notification lamp 142 and a fuel-saving driving notification lamp 144, instead of the display 140. FIG. 18 is a block diagram schematically showing the entire structure of a vehicle 300*i* into which the ECU 170 in accordance with a ninth variation of the first embodiment is incorporated. The vehicle 300*i* shown in FIG. 18 differs from the vehicle 300 shown in FIG. 1, in that the panel meter 100 is replaced with a panel meter 100*i*. The panel meter 100*i* shown in FIG. 18 differs from the panel meter 100 shown in FIG. 1, in that the display 140 is replaced with the notification lamp 142 and the fuel-saving driving notification lamp 144. The other aspects of the vehicle 300*i* are the same as those of the vehicle 300 shown in FIG. 1, and therefore, explanation of them is omitted here.

Operations of the notification lamp 142 and the fuel-saving driving notification lamp 144 are controlled by the notification control unit 260 of the ECU 170. For example, in a case where the notification determining unit 250 determines that the driver is to be notified of the operation result of the operating unit 220, the notification lamp 142 is controlled to blink on and off. The fuel-saving driving notification lamp 144 is switched on when the driving operation being performed by the driver is a fuel-saving driving operation.

FIGS. 19A through 19C are schematic views showing an example of notification by the notifying unit 270 in accordance with the ninth variation. FIG. 19(*a*) is a schematic view showing the state of the notifying unit 270 observed before operation result notification is started. As shown in FIG. 19(*a*), before the operation result notification is started, the notification lamp 142 is not switched on. The fuel-saving driving notification lamp 144 is not switched on, either. The speaker 150 is not emitting any sound.

FIG. 19(*b*) is a schematic view showing the state of the notifying unit 270 observed when the operation result notification is started. As shown in FIG. 19(*b*), when the operation result notification is started, the notification lamp 142 is controlled to blink on and off. If the driving operation being performed by the driver is a fuel-saving driving operation, the fuel-saving driving notification lamp 144 is also controlled to light up. At the same time, a voice message announcing that "the eco-navigation display has started" is emitted from the speaker 150.

The blink rate of the notification lamp 142 may be changed, depending on the reason that the notification determining unit 250 has determined that the driver is to be notified of the operation result of the operating unit 220. For example, in a case where the notification determining unit 250 determines that the driver is to be notified of the operation result of the operating unit 220 because the driver has switched on the notification switch 160, the notification lamp 142 is controlled to blink every one second. In a case where the notification determining unit 250 determines that the driver is to be notified of the operation result of the operating unit 220 because the road category information indicates an expressway though the notification switch 160 is off, the notification lamp 142 is controlled to blink every two seconds. In this manner, the driver can be informed of the reason that the notification lamp 142 is blinking though the driver has not switched on the notification switch 160.

In a case where the notification determining unit 250 determines that the driver is to be notified of the operation result of the operating unit 220 though the notification switch 160 is off, a voice message announcing that "the eco-navigation display has started" is emitted from the speaker 150. In this manner, the driver can be informed that the notification lamp 142 is blinking though the driver has not switched on the notification switch 160.

FIG. 19(*c*) is a schematic view showing the state of the notifying unit 270 observed when the operation result notification is ended. As shown in FIG. 19(*c*), when the operation result notification is ended, the notification lamp 142 is switched off. The fuel-saving driving notification lamp 144 is also switched off. A voice message announcing that "the eco-navigation display has ended" is emitted from the speaker 150. In this manner, the driver can be informed that the notification has been ended.

The ECU 170 in accordance with the ninth variation also includes the notification determining unit 250. Accordingly, even when the notification switch 160 is off, the driver can be notified of the eco-drive support information. As a result, even a driver who is not aware that the eco-drive support device is mounted on the vehicle 300*i* or a driver who is not interested in improving eco-consciousness in the motorized society can be notified of the eco-drive support information. Thus, the eco-consciousness in the motorized society can be improved.

If the notification lamp 142 starts blinking in a case where the vehicle 300*i* does not have the speaker 150, the driver might not notice the blinking of the notification lamp 142. Therefore, the ECU 170 may shuffle the conditions for switching on and off the notification lamp 142 as appropriate. Alternatively, the ECU 170 may use some means other than the notification lamp 142 and the speaker 150 to notify the driver that the driving operation being performed by the driver is a highly eco-conscious driving operation or that the notification of the eco-drive support information to the driver has been started.

In accordance with an aspect of the eco-drive support method of the present invention, the eco-drive support information indicating the eco-consciousness in the driving of the vehicle 300 or 300*i* by the driver is calculated. When there is a request for notification of the eco-drive support information from the input unit, the driver is notified of the eco-drive support information. Even when there is not a request for notification of the eco-drive support information from the input unit, the driver is notified of the eco-drive support information if the predetermined conditions for providing the eco-drive support information are satisfied. This drive support method may be realized by the eco-drive support device (the ECU 170) in accordance with the first embodiment or any of the first through ninth variations of the first embodiment, and therefore, explanation of the method is omitted here.

In accordance with another aspect of the eco-drive support method of the present invention, even when there is not a result for notification of the eco-drive support information from the input unit, or even when the notification switch 160 is off, the driver can be notified of the eco-drive support information if the predetermined conditions for providing the eco-drive support information are satisfied. Accordingly, even a driver who is not aware that the eco-drive support device is mounted on the vehicle or a driver who is not interested in improving eco-consciousness in the motorized society can be notified of the eco-drive support information. Thus, the eco-consciousness in the motorized society can be improved.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An eco-drive support device that notifies a driver of eco-friendliness of a vehicle driving operation being performed by the driver, the eco-drive support device comprising:
   an operating unit that calculates eco-drive support information, wherein the eco-drive support information indicates the eco-friendliness of the vehicle driving operation being performed by the driver;
   a notification control unit that controls a notifying unit to notify the driver of the eco-drive support information, when there is a request from an input unit for notification of the eco-drive support information, the input unit being handled by the driver; and
   a notification terminating unit that is operable by the driver in order to terminate notification of the eco-drive support information when the eco-drive support information is notified though there is not the request from the input unit for notification of the eco-drive support information, the notification terminating unit being different from the input unit;
   wherein the notification control unit controls the notifying unit to notify the driver of the eco-drive support information and a reason that the eco-drive support information providing condition is satisfied though there is not a request from the input unit for notification of the eco-drive support information, when a predetermined eco-drive support information providing condition is satisfied,
   and wherein after the notification terminating unit is operated and notification of the eco-drive support information is terminated, the notification control unit controls the notifying unit to notify the driver of the eco-drive support information only when there is the request from the input unit for notification of the eco-drive support information, and does not use the same eco-drive support information providing condition as used before the notification terminating unit was operated.

2. The eco-drive support device as claimed in claim 1, wherein, under the eco-drive support information providing condition, the driver is notified of the eco-drive support information when a road on which the vehicle is traveling is suitable for a fuel-saving driving operation.

3. The eco-drive support device as claimed in claim 2, wherein the road is an expressway.

4. The eco-drive support device as claimed in claim 2, wherein the notification control unit controls the notifying unit to notify the driver of the eco-drive support information, when the eco-drive support information providing condition is satisfied and an operation result of the operating unit shows that the eco-drive support information indicates high eco-friendliness, even though there is not a request from the input unit for notification of the eco-drive support information.

5. The eco-drive support device as claimed in claim 1, wherein, under the eco-drive support information providing condition, the driver is notified of the eco-drive support information when an amount of change in the vehicle driving operation stays within a predetermined range over a predetermined period of time.

6. The eco-drive support device as claimed in claim 1, wherein, under the eco-drive support information providing condition, the driver is notified of the eco-drive support information when a remaining energy amount in the vehicle is equal to or less than a predetermined value.

7. The eco-drive support device as claimed in claim 6, wherein the remaining energy amount in the vehicle is a remaining battery level in the vehicle.

8. The eco-drive support device as claimed in claim 6, wherein the remaining energy amount in the vehicle is a remaining fuel level in the vehicle.

9. The eco-drive support device as claimed in claim 1, wherein, under the eco-drive support information providing condition, the driver is notified of the eco-drive support information when there is a request from outside the vehicle for a provision of the eco-drive support information to the driver.

10. The eco-drive support device as claimed in claim 1, wherein, under the eco-drive support information providing condition, the driver is notified of the eco-drive support information when a period in which there is not a request from the input unit for notification of the eco-drive support information is equal to or longer than a predetermined period.

11. The eco-drive support device as claimed in claim 1, wherein
   the notifying unit includes a display and a speaker,
   the notification control unit controls the display to change a content of the display from a predetermined information that is different from the eco-drive support information into the eco-drive support information when the eco-drive support information is notified,
   the notification control unit controls the display to change the content of the display from the eco-drive support information into the predetermined information when notification of the eco-drive support information is terminated,
   the notification control unit controls the display to display both the eco-drive support information and the reason that the eco-drive support information providing condition is satisfied, and controls the speaker to notify the driver with a voice message that the eco-drive support information providing condition is satisfied, when the eco-drive support information is notified though there is not the request from the input unit for notification of the eco-drive support information, and
   the notification control unit controls the speaker to notify the driver with the voice message that notification of the eco-drive support information is terminated when notification of the eco-drive support information is terminated.

12. The eco-drive support device as claimed in claim 1, wherein, after the notifying unit notifies the driver of the eco-drive support information, the notification control unit controls the notifying unit to end the notification of the eco-drive support information, when the eco-drive support information providing condition is not satisfied though there is a request from the input unit for notification of the eco-drive support information.

13. The eco-drive support device as claimed in claim 1, wherein, after the notifying unit notifies the driver of the eco-drive support information, the notification control unit controls the notifying unit to end the notification of the eco-drive support information, when a safety problem is raised by notifying the driver of the eco-drive support information though there is a request from the input unit for notification of the eco-drive support information.

14. The eco-drive support device as claimed in claim 12, wherein the notification control unit further controls the notifying unit to notify the driver that the notification of the eco-drive support information has ended, when controlling the notifying unit to end the notification of the eco-drive support information after the notifying unit notifies the driver of the eco-drive support information.

15. The eco-drive support device as claimed in claim 12, wherein the notification control unit further controls the notifying unit to notify the driver of a reason that the notification of the eco-drive support information has been ended, when controlling the notifying unit to end the notification of the eco-drive support information after the notifying unit notifies the driver of the eco-drive support information.

16. An eco-drive support method for notifying a driver of eco-friendliness of a vehicle driving operation being performed by the driver, the eco-drive support method comprising:
  calculating eco-drive support information that indicates the eco-friendliness of the vehicle driving operation being performed by the driver; and
  notifying the driver of the eco-drive support information, when there is a request from an input unit for notification of the eco-drive support information, the input unit being handled by the driver,
  wherein the driver is notified of the eco-drive support information and a reason that the eco-drive support information providing condition is satisfied, when a predetermined eco-drive support information providing condition is satisfied, though there is not a request form the input unit for notification of the eco-drive support information,
  wherein a notification terminating unit is provided, the notification terminating unit being operable by the driver in order to terminate notification of the eco-drive support information when the eco-drive support information is notified though there is not the request from the input unit for notification of the eco-drive support information, the notification terminating unit being different from the input unit, and
  wherein after the notification terminating unit is operated and notification of the eco-drive support information is terminated, the driver of the eco-drive support information is notified only when there is a subsequent request from the input unit for notification of the eco-drive support information, and the eco-drive support information providing condition is different from the eco-drive support information providing condition as used to provide the eco-drive support information before the notification terminating unit was operated.

17. The eco-drive support device as claimed in claim 1, wherein
  the operating unit transmits the eco-drive support information, which is a result of the calculation of the operating unit, to the notification control unit at regular intervals, and
  the eco-drive support information providing condition being satisfied is not a case where each of the regular intervals has passed.

* * * * *